(12) United States Patent
Kay et al.

(10) Patent No.: US 9,527,448 B1
(45) Date of Patent: Dec. 27, 2016

(54) RETRACTABLE STAIR SYSTEM WITH PRECISION ELEVATION CONTROL

(71) Applicant: TORKLIFT INTERNATIONAL INC., Kent, WA (US)

(72) Inventors: Jack Kay, Kent, WA (US); Joel Crawford, Kent, WA (US)

(73) Assignee: TORKLIFT INTERNATIONAL INC., Kent, WA (US)

( * ) Notice: Subject to any disclaimer, the term of this patent is extended or adjusted under 35 U.S.C. 154(b) by 0 days.

(21) Appl. No.: 15/149,138

(22) Filed: May 8, 2016

Related U.S. Application Data

(60) Provisional application No. 62/246,601, filed on Oct. 26, 2015.

(51) Int. Cl.
*B60R 3/02* (2006.01)
*B60R 3/00* (2006.01)

(52) U.S. Cl.
CPC ................................. *B60R 3/007* (2013.01)

(58) Field of Classification Search
CPC .......................................... B60R 3/007
USPC .................. 280/163, 166; 182/66.1, 67.4
See application file for complete search history.

(56) References Cited

U.S. PATENT DOCUMENTS

| | | | | |
|---|---|---|---|---|
| 2,050,593 A * | 8/1936 | Traut | ................ | E04F 11/06 182/158 |
| 2,487,921 A * | 11/1949 | Culver | ................ | B60R 3/02 105/448 |
| 3,180,451 A * | 4/1965 | Patterson | ................ | E04F 11/06 182/106 |
| 3,394,947 A * | 7/1968 | Strube, Sr. | ................ | B60R 3/02 280/166 |
| 3,462,170 A * | 8/1969 | Smith | ................ | B60P 3/36 182/157 |
| 3,610,658 A * | 10/1971 | Sartori | ................ | B62D 43/02 224/402 |
| 3,756,622 A * | 9/1973 | Pyle | ................ | B60R 3/02 280/166 |
| 3,807,757 A * | 4/1974 | Carpenter | ................ | B60R 3/02 182/95 |
| 3,858,905 A * | 1/1975 | Peebles | ................ | B60R 3/007 182/106 |
| 4,623,160 A * | 11/1986 | Trudell | ................ | B60R 3/02 182/127 |
| 4,720,116 A * | 1/1988 | Williams | ................ | B60R 3/02 182/127 |
| 5,005,850 A * | 4/1991 | Baughman | ................ | B60R 3/005 182/127 |

(Continued)

*Primary Examiner* — Jeffrey J Restifo
(74) *Attorney, Agent, or Firm* — R. Reams Goodloe, Jr.

(57) ABSTRACT

A retractable stair system for vehicles. The apparatus includes stairs which are retractable into a frame, or extendable to provide a set of stairs with relatively uniform height therebetween. Indexing plates with locking notches and companion latches with latch tongues to fit in the notches enable adjustment of the height of a top step S1 in a set of steps in an extensible-retractable stairs assembly. Extensible legs are provided which are individually vertically adjustable to provide secure engagement with an uneven substrate such as rocky ground or a sloping surface. Foot pads are pivotally attached to the extensible legs. The combination of vertical adjustability, the selection of a desired number of stairs, and individual top stair height adjustability, make the unit adaptable for use in a variety of vehicles.

28 Claims, 30 Drawing Sheets

(56) References Cited

U.S. PATENT DOCUMENTS

| | | | | |
|---|---|---|---|---|
| 5,039,119 A * | 8/1991 | Baughman | B60R 3/005 | 182/127 |
| 5,311,965 A * | 5/1994 | Wu | E06C 9/14 | 182/74 |
| 5,505,476 A * | 4/1996 | Maccabee | B60R 3/02 | 280/163 |
| 5,547,040 A * | 8/1996 | Hanser | B60R 3/02 | 182/127 |
| 5,941,342 A * | 8/1999 | Lee | B60R 3/02 | 182/127 |
| 5,957,237 A * | 9/1999 | Tigner | B60R 3/02 | 182/127 |
| 6,082,751 A * | 7/2000 | Hanes | B60R 3/02 | 280/163 |
| 6,213,486 B1 * | 4/2001 | Kunz | B60R 3/02 | 280/163 |
| 6,659,224 B2 * | 12/2003 | Medsker | E06C 5/04 | 182/127 |
| 8,246,063 B1 * | 8/2012 | Rowland | B60R 3/02 | 280/163 |
| 8,251,178 B2 * | 8/2012 | Krobot | B60R 3/02 | 182/127 |
| 8,678,411 B2 * | 3/2014 | Kibler | E06C 5/06 | 182/127 |
| 9,010,473 B1 * | 4/2015 | Rasmussen | B60R 3/02 | 180/166 |
| 2008/0157500 A1 * | 7/2008 | Raley | E06C 1/387 | 280/166 |
| 2009/0189365 A1 * | 7/2009 | Ferguson | B60R 3/02 | 280/166 |
| 2011/0140389 A1 * | 6/2011 | Ellement | E06C 5/28 | 280/166 |
| 2013/0193667 A1 * | 8/2013 | Ellement | B60R 3/02 | 280/166 |
| 2015/0097353 A1 * | 4/2015 | Rasmussen | B60R 3/02 | 280/166 |

* cited by examiner

DETAIL M

DETAIL H

DETAIL A

1/4" x 5/8" X 1/4" NYLON SPACER BETWEEN TWO THIN WASHERS

THE SS GLOW STEP ADAPTER BRACKET ATTACHES WITH TWO 1/4"-20 X 1.5" SS HEX BOLTS

DETAIL B

DETAIL AB

ONE 1/4" x 5/8" X 1/4" NYLON SPACER BETWEEN TWO THIN WASHERS

THE SS GLOW STEP ADAPTER BRACKET ATTACHES WITH TWO 1/4"-20 X 1.5" SS HEX BOLTS

DETAIL AC

118L LARGE SPACER IS 1/4" x 5/8" x 1"

118S SMALL SPACER IS 1/4" x 1/2" x 1"

PAN HEAD MACHINE SCREW 1/4"-20 x 3 1/4"

4 STEP SHELF LOCATION

DETAIL R

5 STEP SHELF LOCATION

DETAIL T

6 STEP SHELF LOCATION

DETAIL U

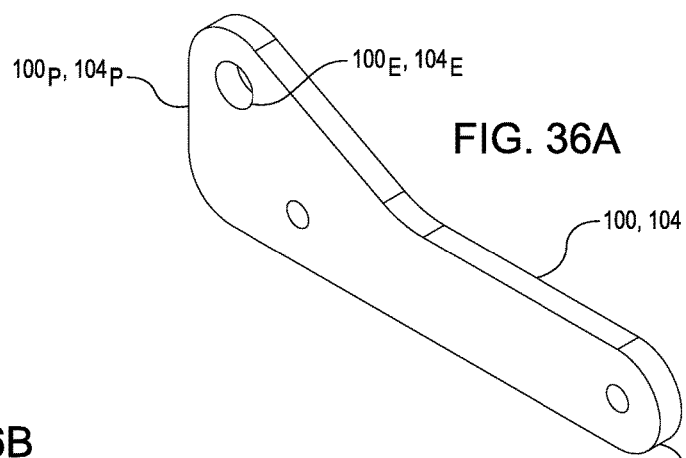
FIG. 36A
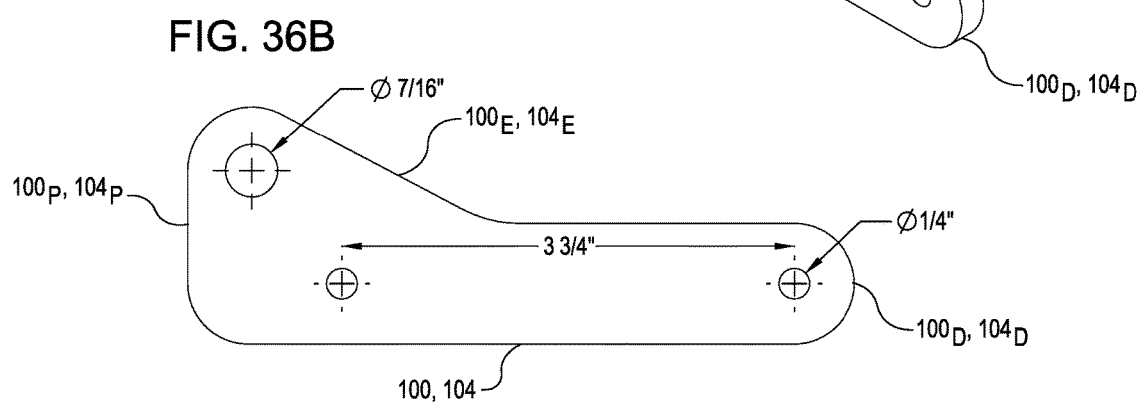
FIG. 36B
FIG. 36D
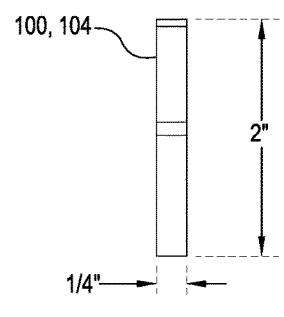
FIG. 36C
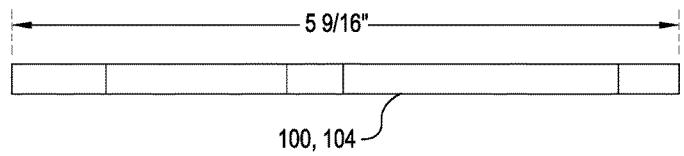

DETAIL L

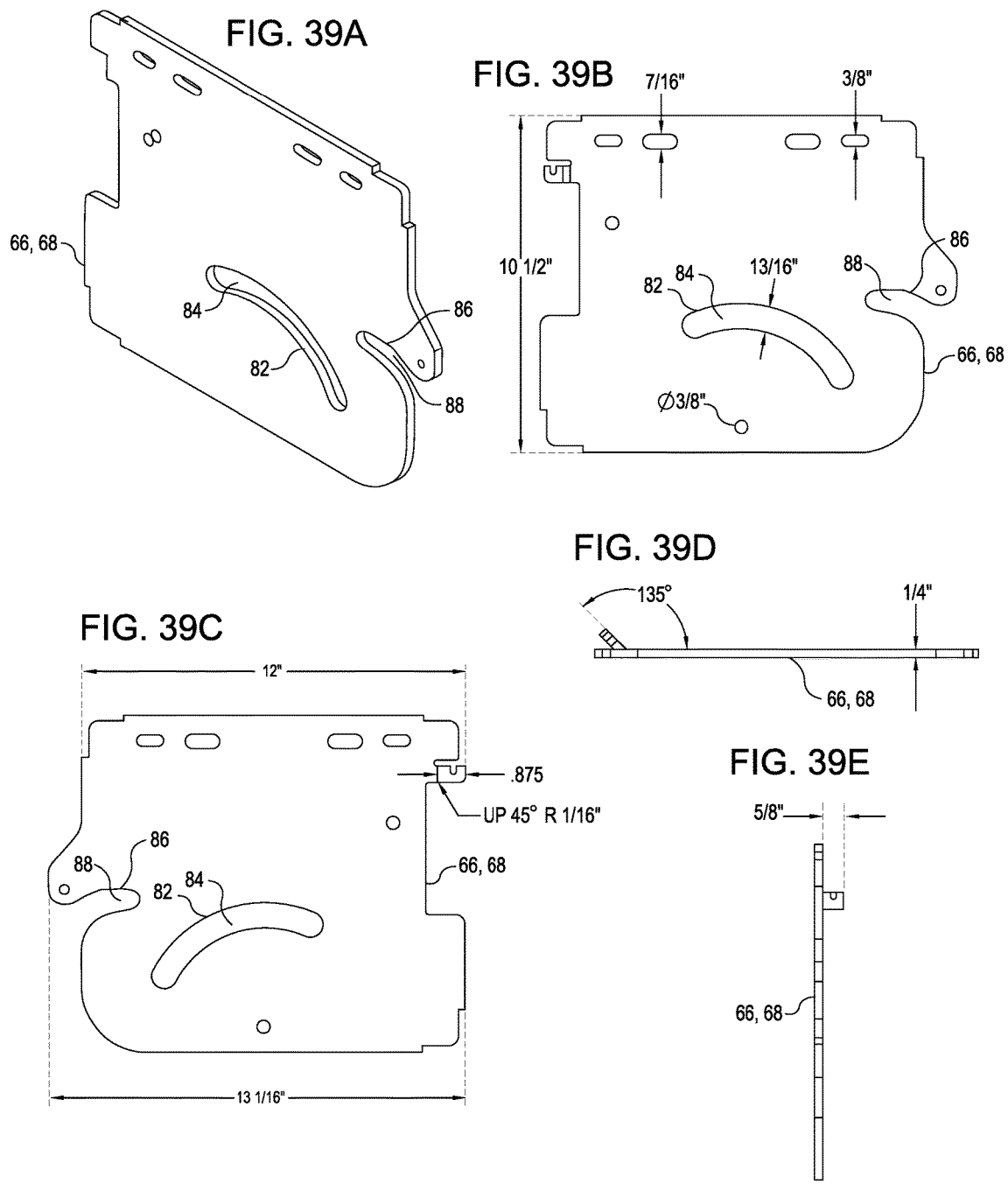

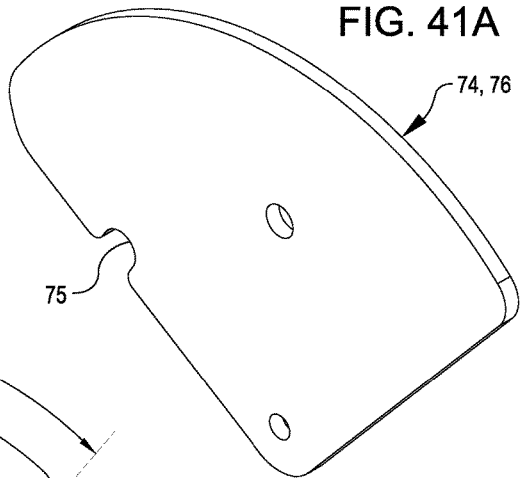
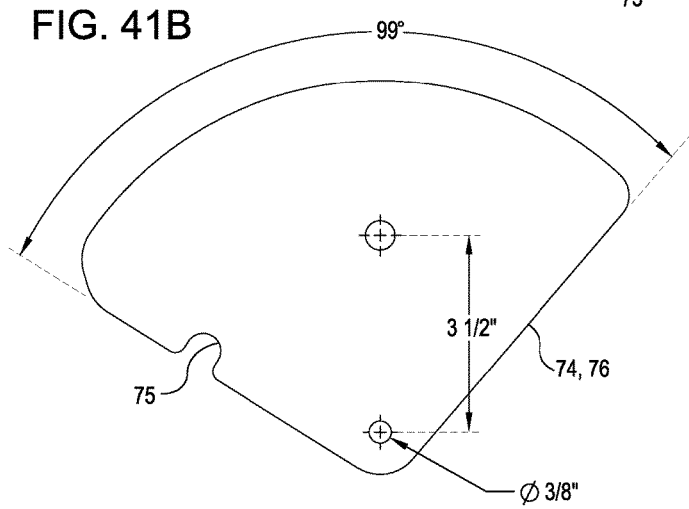
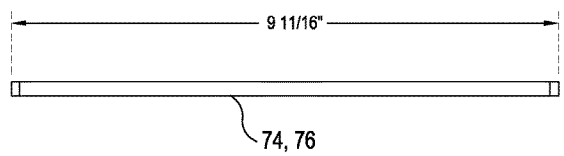
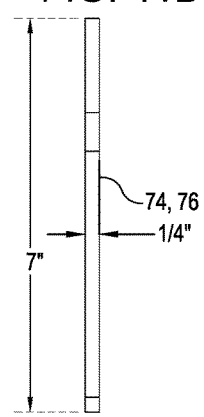

FIG. 43A
FIG. 43D
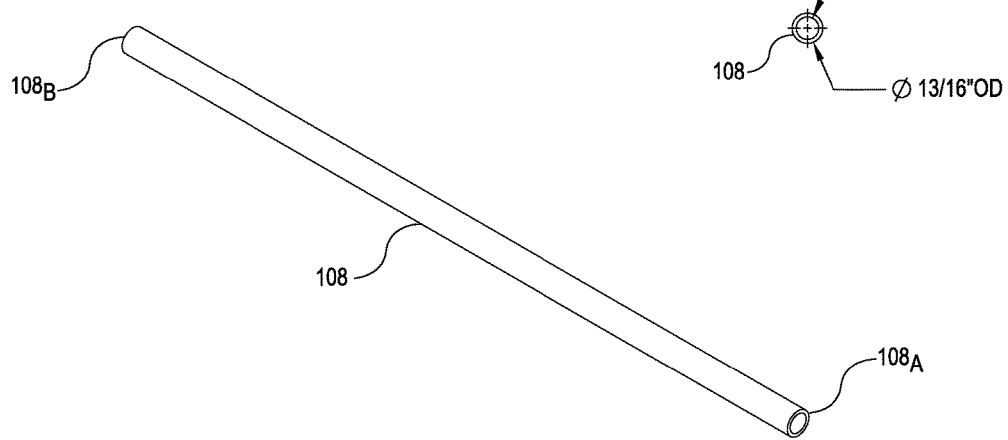
FIG. 43B
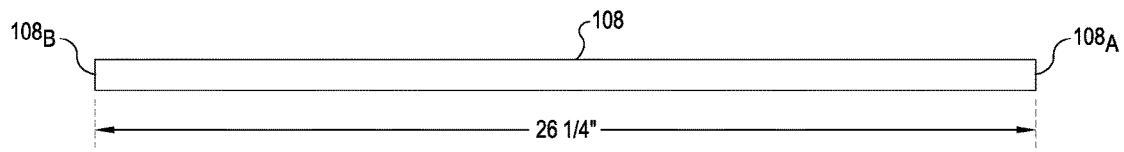
FIG. 43C
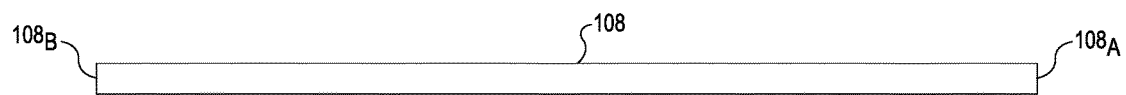

RETRACTABLE STAIR SYSTEM WITH PRECISION ELEVATION CONTROL

RELATED PATENT APPLICATIONS

This application claims priority from prior U.S. Provisional Patent Application Ser. No. 62/246,601, filed Oct. 26, 2015, entitled RETRACTABLE STAIR SYSTEM FOR VEHICLE, the disclosure of which is incorporated herein in its entirety, including the specification, drawing, and claims, by this reference.

STATEMENT OF GOVERNMENT INTEREST

Not Applicable.

COPYRIGHT RIGHTS IN THE DRAWING

A portion of the disclosure of this patent document contains material that is subject to copyright protection. The patent owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates to retractable stairs, and in particular, to stairs configured for use with driven or towed vehicles, such as trucks, trailers, (including semi-trailer truck tractor units, or other over-the road rigs or specific purpose vehicles such as earth movers or large dump trucks), campers on pickup trucks, towed camper doorways, motor homes, or the like.

BACKGROUND

A continuing need exists for improvements in stair systems for use in accessing a variety of driven or towed vehicles. Often, vehicles of various types park at locations where an entrance door or platform is at a level above the ground where ease and/or safety of access to the vehicle may be facilitated by the availability of a stair system. Further, quite often a vehicle is parked over sloping or uneven ground, so placement of legs on the ground, for support or stability, is often problematic in prior art designs of which I am aware. A wide variety of stair structures have been known and utilized as appropriate for various applications. And, although many of such prior art stair structures have been constructed which in some limited fashion enable a user to effect or provide some adjustment in the stairs, at least in the case of campers used on pickup trucks, adjustment is generally only with respect to extension from the camper. Thus, often a separate stool, block of wood, or other structure is necessary for placement on the ground in order to provide reasonable height for users to access existing stairs to a camper.

A common problem encountered in prior art stair systems is that when operating on uneven ground, such structures are often not uniformly adjustable (often are not even variably adjustable) to provide a secure final level platform near the ground. Thus, such prior art stair structures inevitably leave a gap of a few inches between a desirable stair platform height and the actual stair platform height which may be achieved. Also, it is often rather difficult to achieve a quick adjustment in any of the available stair designs. Often, the result is a vehicle located a particular site, such as a campsite or jobsite with an entrance/exit stairs/platform which does not provide adequate safety in terms of providing an even distance between stairs, vertically, or with respect to providing stable contact with the ground below.

Thus, there remains a continuing unmet need for a retractable stairs system for a vehicle in which the total stair height is adjustable, and in which stable ground contact is provided via support pads, with individually adjustable heights between the stairs and the support pads on opposing sides of the stairs.

SOME OBJECTS, ADVANTAGES, AND NOVEL FEATURES

An objective of our invention is to provide a design for a retractable stair system in which a varying number of steps may be provided.

Another objective of our invention is to provide a design for a retractable stair system in which the support pad distance below the bottom step is individually adjustable at either side of the step.

Another important objective is to provide a retractable stair system which is easily and rapidly adjustable in total stair height, yet retains the ability to evenly space the stair steps which are provided.

Another important objective is to provide retractable stair system in which the distance from the top of the stair assembly to the level of the first step is adjustable in selectable increments of height.

A related and important objective is to provide a retractable stair system in which the stairs are sturdy and of high strength.

A related and important objective is to provide a retractable stair system in which the length of support to ground contact pads is quickly adjustable, individually, on each side of the retractable stair system.

Another important objective is to provide a compact retractable stair system structure and frame design in which the stairs may be easily installed in existing or new vehicles, and in which the retractable stairs are neatly and securely stowed when not in use, and thus, when the vehicle is in service over the road.

Finally, another important objective is to provide a high strength retractable stair system which can be conveniently and easily built with conventional manufacturing processes, so that manufacturing costs are minimized.

SUMMARY

We have now invented a retractable stair system for vehicles which provides for stowage of stairs when not in use, and which provides convenient, adjustment of the height or level of the first step, and then equal spacing between stair steps when the stair system is deployed. This is important since it enhances the safety of access to and from a vehicle (e.g., a camper mounted on the back of a pickup truck). Further, individually adjustable foot pads enable secure support of the stairs, even when the stair system is deployed on uneven ground.

The retractable stair system disclosed herein includes four major components. These major components are (a) a frame, (b) an extensible-retractable scissors stair assembly, (c) a manually adjustable latching system for locking the extensible-retractable scissors stair assembly in a particular position, and (d) individually adjustable foot pads. For the latter item, in an embodiment a detent system is utilized, where a spring loaded pin is adjustably locatable to any one of a plurality of latch hole locations along an extensible support tube, so that when a detent is pressed inward, an adjustment may be made, and when the detent protrudes through a specific latch hole, the height of the foot pad is secured at such location. In this manner, foot pads at either side of the stairs may be individually adjusted when the retractable stair system is located above uneven ground.

Moreover, the retractable stair system with precision elevation control needs no extra parts, bolts, or other components for on-site assembly and deployment. Resultantly, the retractable stair system with precision elevation control disclosed herein is easy to use, since all necessary components are already on board and readily available.

BRIEF DESCRIPTION OF THE DRAWING

The present invention(s) will be described by way of exemplary embodiments, using for illustration the accompanying drawing in which like reference numerals denote like elements, and in which:

In FIG. 18, an embodiment for a retractable stair system having three stair steps is shown in a fully retracted position, wherein the stair steps are secured for over-the-road movement.

In FIG. 19, an embodiment for a retractable stair system having three stair steps as just shown in FIG. 18 above is now shown with the latch handle in a slightly raised position, wherein the latch tongue on the latch handle is beginning to disengage from the first locking recessed notch in the first indexing plate; in this FIG. 19, the first side plate is depicted in broken lines in a "see-though" configuration, so the view is as if looking through the first side plate to see the first indexing plate and the first latch handle.

In FIG. 20 an embodiment for a retractable stair system having three stair steps is provided as just shown in FIGS. 18-19, but now shown with the latch handle in a slightly further partially raised position, wherein the latch tongue on the latch handle is still in the process of disengaging from the first locking recessed notch in the first indexing plate; in this diagram, the first side plate is depicted in broken lines in a "see-though" configuration, so the view is as if looking through the first side plate to see the first indexing plate and the first latch handle.

In FIG. 21 an embodiment for a retractable stair system having three stair steps is provided as just shown in FIGS. 18-20, but now shown with the latch handle in a raised position, wherein the latch tongue on the latch handle has disengaged from the first locking recessed notch in the first indexing plate, so that the extensible-retractable scissors stairs assembly may begin to be extended outward as the first indexing plate also pivots outwardly and downwardly (i.e. clockwise to the right in this FIG. 21).

In FIG. 22 an embodiment for a retractable stair system having three stair steps is provided as just shown in FIGS. 18-21, but now shown with the latch handle in a lowered, second position, wherein the latch tongue on the latch handle has engaged a second locking recessed notch in the first indexing plate to place the top stair at a first position having a selected stair height $H_{SA}$, and wherein the extensible-retractable-scissors stairs assembly is provided ready for extension; again in this diagram, the first side plate is depicted in broken lines in a "see-though" configuration, so the view is as if looking through the first side plate to see the first indexing plate and the first latch handle.

In FIG. 23 an embodiment for a retractable stair system having three stair steps is provided as just shown in FIGS. 18-22, but now shown with the first latch handle in a raised position, wherein the latch tongue on the first latch handle has disengaged from the first locking recessed notch in the first indexing plate, so that the first stair in the extensible-retractable scissors stairs assembly may be further lowered to a selected stair height as the first indexing plate pivots outwardly and downwardly (i.e. clockwise to the right in this FIG. 23).

In FIG. 24, the embodiment for a retractable stair system having three stair steps as just shown in FIGS. 18-23 above is now shown with the first latch handle in a lowered, third position, wherein the latch tongue on the first latch handle has engaged a third locking recessed notch in the first indexing plate to place the top stair at a second position having a selected stair height $H_{SB}$, and wherein the extensible-retractable scissors stairs assembly is provided ready for extension; again in this diagram, the first side plate is depicted in broken lines in a "see-though" configuration, so the view is as if looking through the first side plate to see the first indexing plate and the first latch handle.

In FIG. 25 an embodiment for a retractable stair system having three stair steps is provided as just shown in FIGS. 18-24, but now shown with the first latch handle in a lowered, fourth position, wherein the latch tongue on the first latch handle has engaged a fourth locking recessed notch in the first indexing plate to place the top stair at a third position having a selected stair height $H_{SC}$, and wherein the extensible-retractable scissors stairs assembly is provided ready for extension.

In FIG. 26 an embodiment for a retractable stair system is provided having three stair steps as just shown in FIGS. 18-25, now shown in the same position as just depicted in FIG. 25 above, but without the use of broken lines to provide a "see-through" first side plate as was provided in FIG. 25 above.

In FIG. 27 an embodiment for a retractable stair system is provided having three stair steps as just shown in FIGS. 18-26, but now additionally showing the method of extension of the extensible-retractable scissors stairs assembly and independently adjustable legs and their supporting pivotably mounted foot pads.

In FIG. 28 an enlarged portion of an embodiment for a retractable stair system having three stair steps as was just shown in FIGS. 18-27 above is now shown in a position similar to the position as just depicted in FIG. 27 above, but now additionally showing details which allow independent extension or retraction of legs supporting the foot pads by way of holes in a tube which may be selected for use of a detent, and in which a spring loaded detent securely holds the foot pad at a selected distance below the bottom step.

In FIG. 29 an enlarged portion of an embodiment for a retractable stair system having three stair steps as just shown in FIGS. 18-28 above is now shown in a position wherein a first foot pad and a second foot pad are independently deployed at different heights above a substrate surface above which the stair system is located.

FIG. 36A provides a perspective view of an embodiment for an adapter bracket, one of which is used on each side of the retractable stairs to attach opposing side of the extensible-retractable scissors stairs assembly to flat bar arms.

FIG. 36B provides a side view of an embodiment for an adapter bracket.

FIG. 36C provides a top view of an embodiment for an adapter bracket.

FIG. 36D provides a front end view of an embodiment for an adapter bracket.

FIG. 39A provides a perspective view of an embodiment for a side plate, two of which are used to provide sides of a frame for an extensible-retractable scissors stairs assembly.

FIG. 39B provides a side view of an embodiment for a first side plate.

FIG. 39C provides a side view of an embodiment for a second side plate.

FIG. 39D provides a top view of an embodiment for a side plate.

FIG. 39E provides an end view of an embodiment for a side plate.

FIG. 41A provides a perspective view of an embodiment for a keeper plate, two of which are used to provide a rotatable assembly, one of which is used at each side of the frame of the retractable stairs system.

FIG. 41B provides a side view of an embodiment for a keeper plate.

FIG. 41C provides a top view of an embodiment for a keeper plate.

FIG. 41D provides a front end view of an embodiment for a keeper plate.

FIG. 43A provides a perspective view of an embodiment for a latch pipe, used to provide a latching mechanism for the extensible retractable scissors stairs assembly.

FIG. 43B provides a side view of an embodiment for a latch pipe.

FIG. 43C provides a top view of an embodiment for a latch pipe.

FIG. 43D provides an end view of an embodiment for a latch pipe.

FIG. 44C top view of an embodiment for a flat bar arm.

Figure 1:
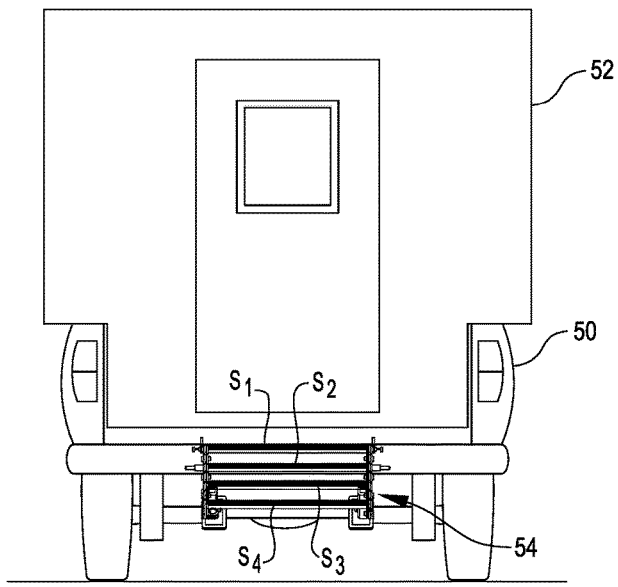
FIG. 1 is a rear elevation view of a camper situated in a conventional arrangement on the bed of a pickup truck, showing mounted thereon an embodiment for a retractable stair system in which four stair steps are provided.
Figure 3:
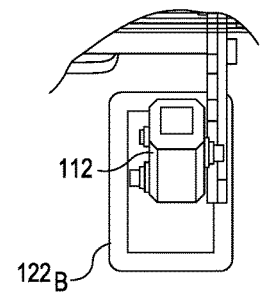
FIG. 3 is a detail (Detail M from FIG. 2) of an embodiment for a foot pad for use with an exemplary retractable stair system, providing a view looking down at a pair of coupled tubes which may be deployed in a nested, telescoping fashion for adjustment of height of the foot pad below a bottom stair step and above a substrate.

The foregoing figures, being merely exemplary, contain various elements that may be present or omitted from a final configuration for an embodiment of a retractable stair system with precision elevation control, or that may be implemented in various embodiments described herein for a retractable stair system for a vehicle. Other variations in retractable stair systems for vehicle may use other mechanical structures, mechanical arrangements, or size and shape of components, and yet employ the principles described herein and as generally depicted in the drawing figures provided, and as more specifically called out in the claims set forth below. In particular, although specific dimensions have been provided in many of the drawing figures, such dimension are provided merely to enable those of skill in the art to make and use the claimed invention, and there is no intention to limit the claimed invention to such dimensional data, which is exemplary rather than mandatory. Thus, a retractable stair system with precision elevation control may be provided which is sized up or down from any such dimensions provided, without affecting the scope of the appended claims. An attempt has been made to draw the figures in a way that illustrates at least those elements that are significant for an understanding of exemplary retractable stair system with precision elevation control which may be used in various types of vehicles.

It should be understood that various features may be utilized in accord with the teachings hereof, as may be useful in different embodiments as useful for various sizes and shapes of retractable stair systems for vehicles, depending upon the specific requirements (such as typical height of the bottom of a vehicle door above the road) within the scope and coverage of the teachings herein as defined by the claims. Further, like features in various embodiments for retractable stair systems may be described using like reference numerals, or other like references, without further mention thereof.

DETAILED DESCRIPTION

Attention is directed to FIG. 1, where rear elevation view of a pickup truck 50 having a camper 52 thereon is provided, illustrating the use of an embodiment of a retractable stair system 54 having four stair steps ($S_1$, $S_2$, $S_3$, and $S_4$, respectively) is provided mounted thereon. As will be further noted below, a retractable stairs system may, in various embodiments, be provided with a number N of stairs S, wherein N is a positive integer. In various embodiments illustrated, the number N of stairs S ranges from 2 to 6, inclusive.

Figure 4:
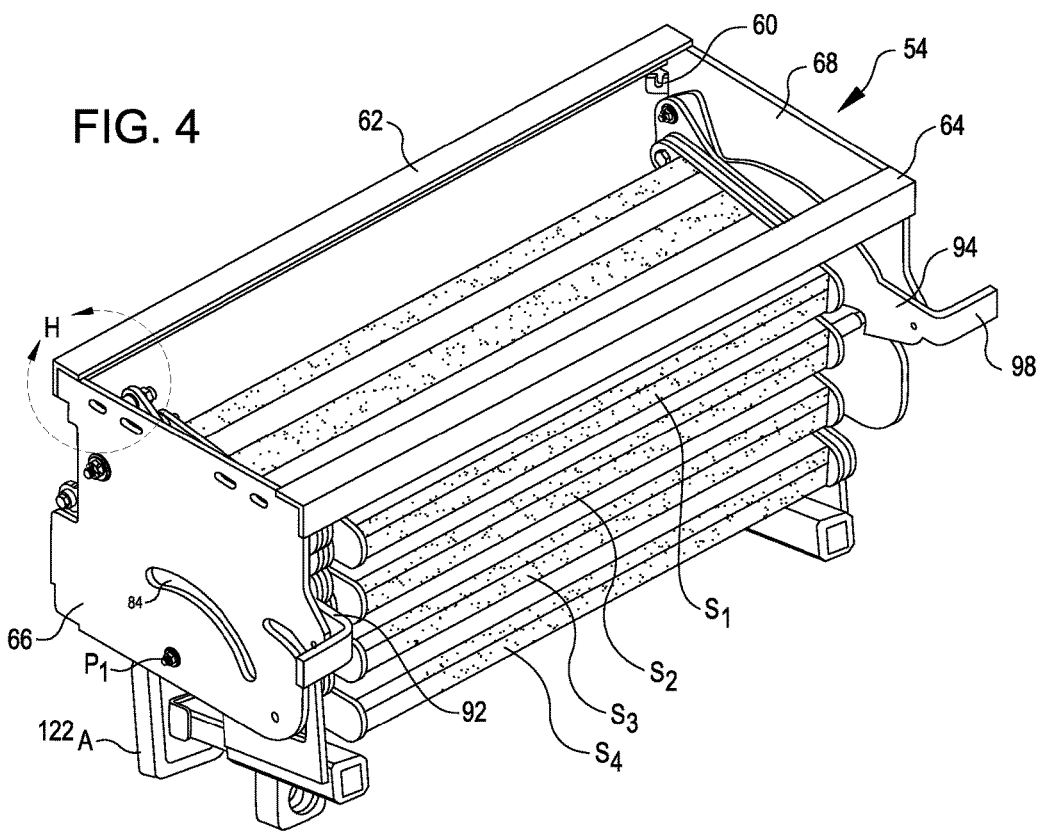
FIG. 4 is a perspective view of an embodiment for a retractable stair system as just depicted in FIGS. 1 and 2 above, and in which four stair steps are retracted into the mounting frame, and further showing first and second slide plates at first and second sides of the frame, between first and second longitudinally extending frame members, as well as the first and second latch handles which enable locking and unlocking of latches which secure the first step of the stair system at a selected height with respect to the top of the mounting frame, as well as lock the stairs when in a retracted, stowed configuration as illustrated in this FIG. 4.
Figure 5:
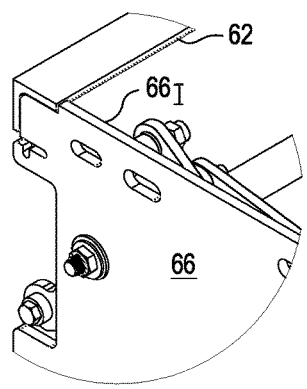
FIG. 5 is an enlarged perspective view of a detail (Detail H from FIG. 4) for portions of an embodiment for a slide plate, including one of the attachments of the slide plate to a first longitudinally extending frame member.
Figure 6:
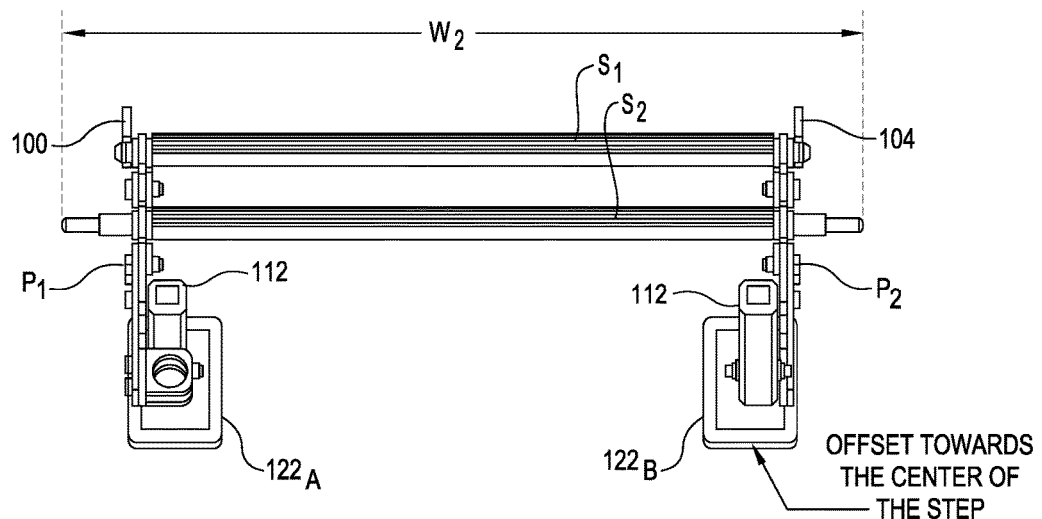
FIG. 6 is an elevation view of an embodiment for a retractable stair system similar to that just depicted in FIG. 1 above, but now showing portions of a retractable stair system embodiment in which two stair steps are provided.
Figure 7:
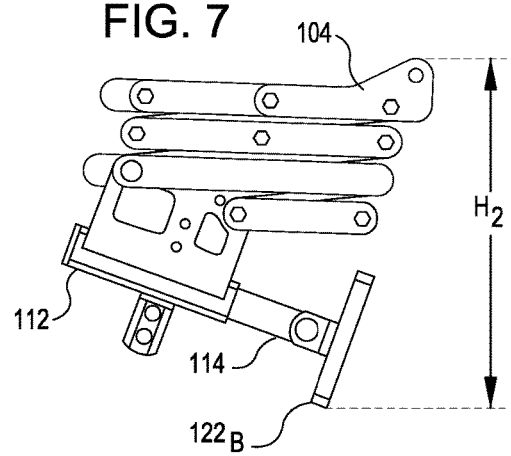
FIG. 7 is a side elevation view of portions of an embodiment for the working components of a retractable stair system as just depicted in FIG. 6 above, now showing a retractable stair system embodiment depicted in a compact arrangement as if the two stair steps were retracted into at least a portion of the frame and substantially between opposing first and second slide plates.
Figure 30:
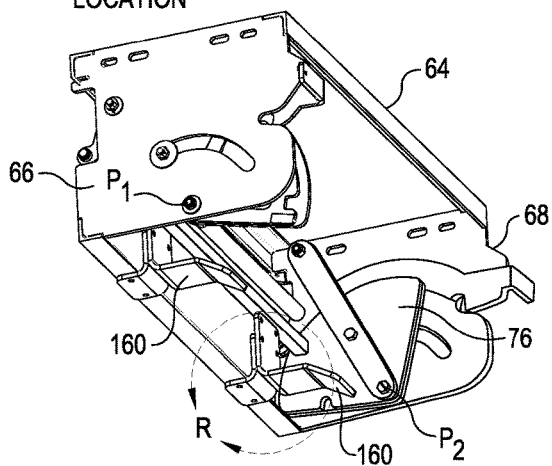
FIG. 30 provides a bottom perspective view of the frame and some of the operational mechanisms of an embodiment for a retractable stair system having four steps, and further shows the location of a shelf to secure stair steps during storage, i.e., when the extensible-retractable scissors stairs assembly has been retracted.
Figure 31:
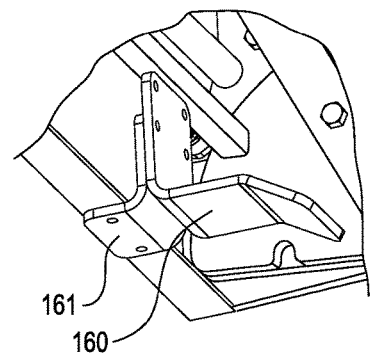
FIG. 31 provides details of an embodiment for a shelf for storage of steps, especially as useful in an embodiment having four steps, as generally depicted in FIG. 30 above.
Figure 32:
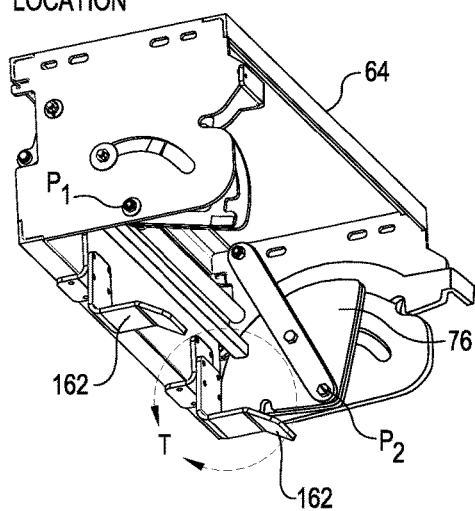
FIG. 32 is similar to FIG. 30, and provides a bottom perspective view of the frame and some of the operational mechanisms of an embodiment for a retractable stair system having five steps, and further shows the location of a shelf to secure stair steps during storage, i.e., when the extensible-retractable scissors stairs assembly has been retracted.
Figure 33:
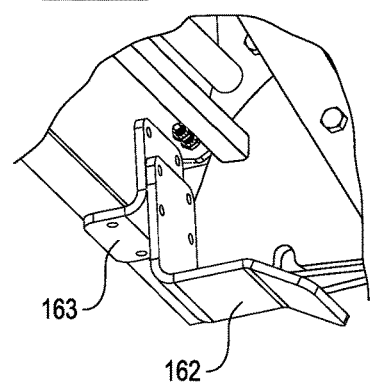
FIG. 33 provides details of an embodiment for a shelf for storage of steps, especially as useful in an embodiment having five steps, as generally depicted in FIG. 32 above.
Figure 34:
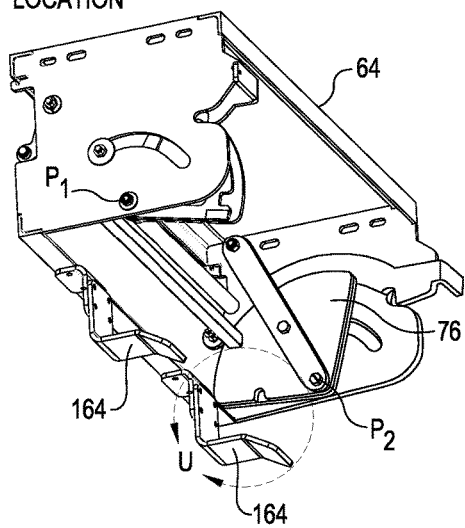
FIG. 34 is similar to FIGS. 30 and 32, and provides a bottom perspective view of the frame and some of the operational mechanisms of an embodiment for a retractable stair system having six steps, and further shows the location of a shelf to secure six stair steps during storage, i.e., when the extensible-retractable scissors stairs assembly has been retracted.
Figure 35:
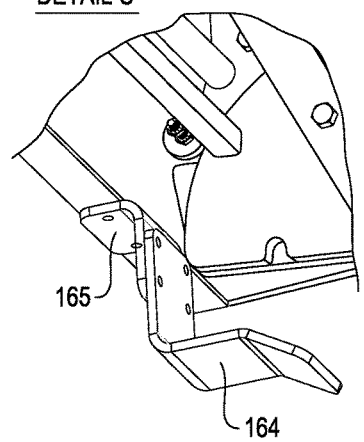
FIG. 35 provides details of an embodiment for a shelf for storage of steps, especially as useful in an embodiment having six steps, as generally depicted in FIG. 34 above.
Figure 37:
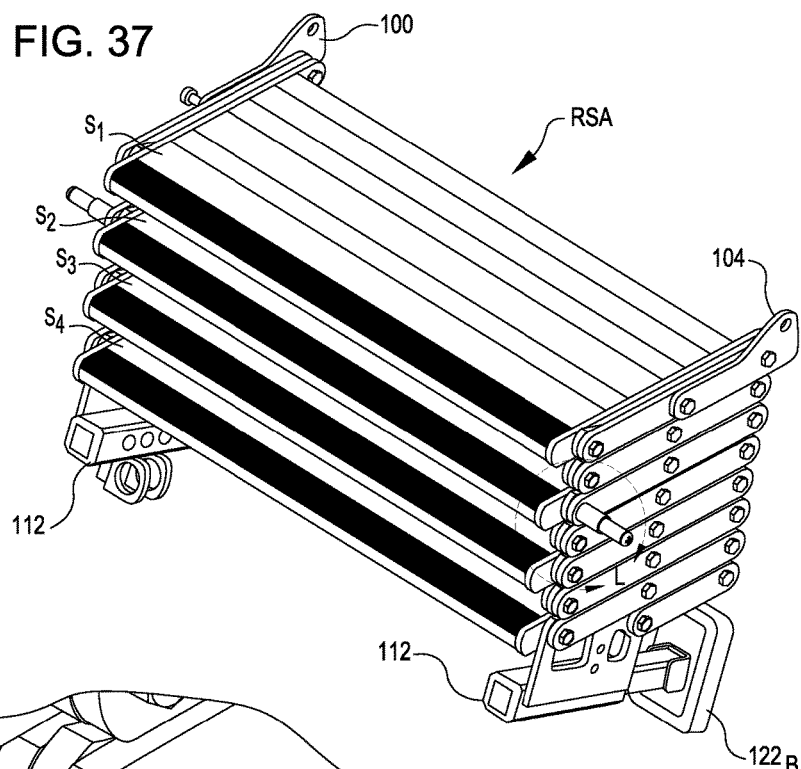
FIG. 37 provides a perspective view of an embodiment for an extensible-retractable scissors stairs assembly having four stairs, and shows adapter brackets mounted thereon.
Figure 38:
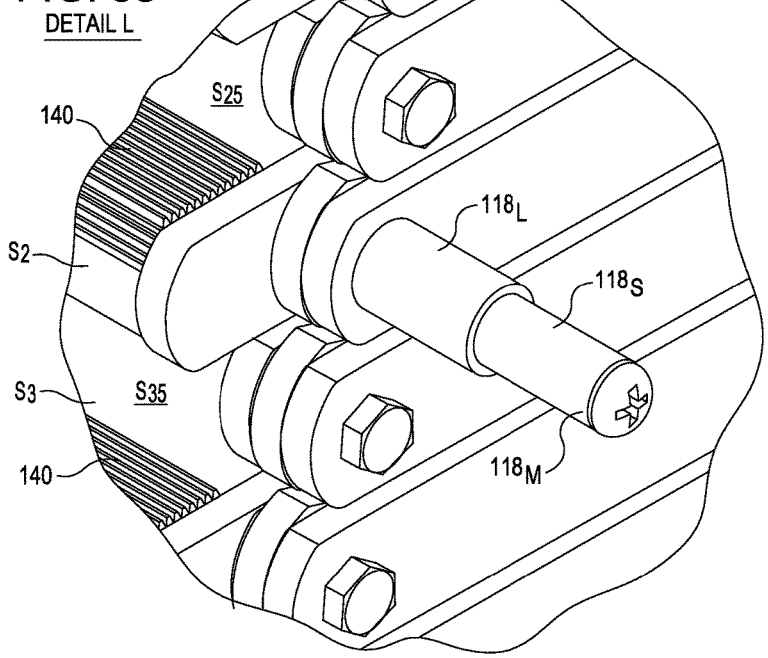
FIG. 38 provides a perspective view of a portion of an embodiment for a retractable-extensible scissors stairs assembly having four stairs, taken as detail L from FIG. 37, and now shows details for an embodiment of a latching stud, as may be used on either side of an extensible-retractable scissors stairs assembly.

As seen in FIG. 4 and similar figures of the drawing, generally, a frame 60 is providing including first 62 and second 64 upper longitudinal members which extend between first 66 and second 68 side plates. Also, the frame 60 includes a third lower longitudinally extending member 70 extending between the first 66 and second 68 side plates (e.g., see FIG. 24). In some of the drawing figures, a two step ($S_1$, $S_2$) or three step ($S_1$, $S_2$, $S_3$), or four step ($S_1$, $S_2$, $S_3$, and $S_4$) configurations are provided for an extensible-retractable scissors stairs assembly RSA. As noted above and with configurations as noted, for example in FIGS. 30, 32, and 34, four step, five step, and six step configurations may be utilized. A keeper longitudinal stiffener 72 is provided disposed between a first keeper plate 74 and a second keeper plate 76. Between a first keeper plate 74 and a first slide plate 66 is located a first indexing plate 80. Between the second keeper plate 76 and a second side plate 68 is located a second indexing plate 90. A first latch 92 is provided mounted for pivotable movement to allow releasable locking engagement with the first indexing plate 80. A second latch 94 is provided mounted for pivotable movement to allow releasable locking engagement with the second indexing plate 90. A latch longitudinal stiffener 96 runs between the first latch 92 and the second latch 94 (see FIGS. 22-23). A keeper longitudinal stiffener 72 runs between the first keeper plate 74 and the second keeper plate 76 (see FIGS. 22-27). The entire retractable stair assembly RSA is mounted for pivotable movement between first adaptor bracket 100 and first flat bar arm 102, and between a second adaptor bracket 104 and second flat bar arm 106 (see FIG. 19 or FIG. 25). The first flat bar arm 102 is pivotably mounted to the first side plate 66; a pivot $P_1$ extends through the first keeper plate 74 and the first indexing plate 80. Likewise, the second flat bar arm 106 is pivotably mounted to the second side plate 68; a pivot $P_2$ extends through the second keeper plate 76 and the second indexing plate 90. The first flat bar arm 102 has associated therewith or attached thereto a first guide $G_1$ positioned for arcuate movement in guide track $T_1$ of the first side plate 66. The second flat bar arm 106 has associated therewith or attached thereto a second guide $G_2$ attached for arcuate movement in a guide track $T_2$ of the second side plate 68. Note from FIGS. 41A and 41B that the first keeper plate 74 and second keeper plate 76 may each include keeper cutout 75, to allow each of the first keeper plate 74 and the second keeper plate 76 to clear the respective pivots $P_1$ and $P_2$ when the retractable stair system 54 is in a retracted, stair stowed configuration as discussed below.

The top stair $S_1$ in any group of stairs $S_1$, $S_2$, $S_3$, etc. may be secured at a selected height $H_{SA}$, $H_{SB}$, $H_{SC}$, etc. below the top of the frame of the retractable stair system. In an embodiment, once the top stair $S_1$ is secured by use of the locking latch system just described, the retractable-extensible stair assembly RSA may be pulled out to extend the set of stairs to a desired overall height, while the scissors construction provides for uniform spacing distance D between each of the stairs ($S_1$, $S_2$, $S_3$) in a selected set of stairs, as illustrated in FIG. 29.

Figure 29:
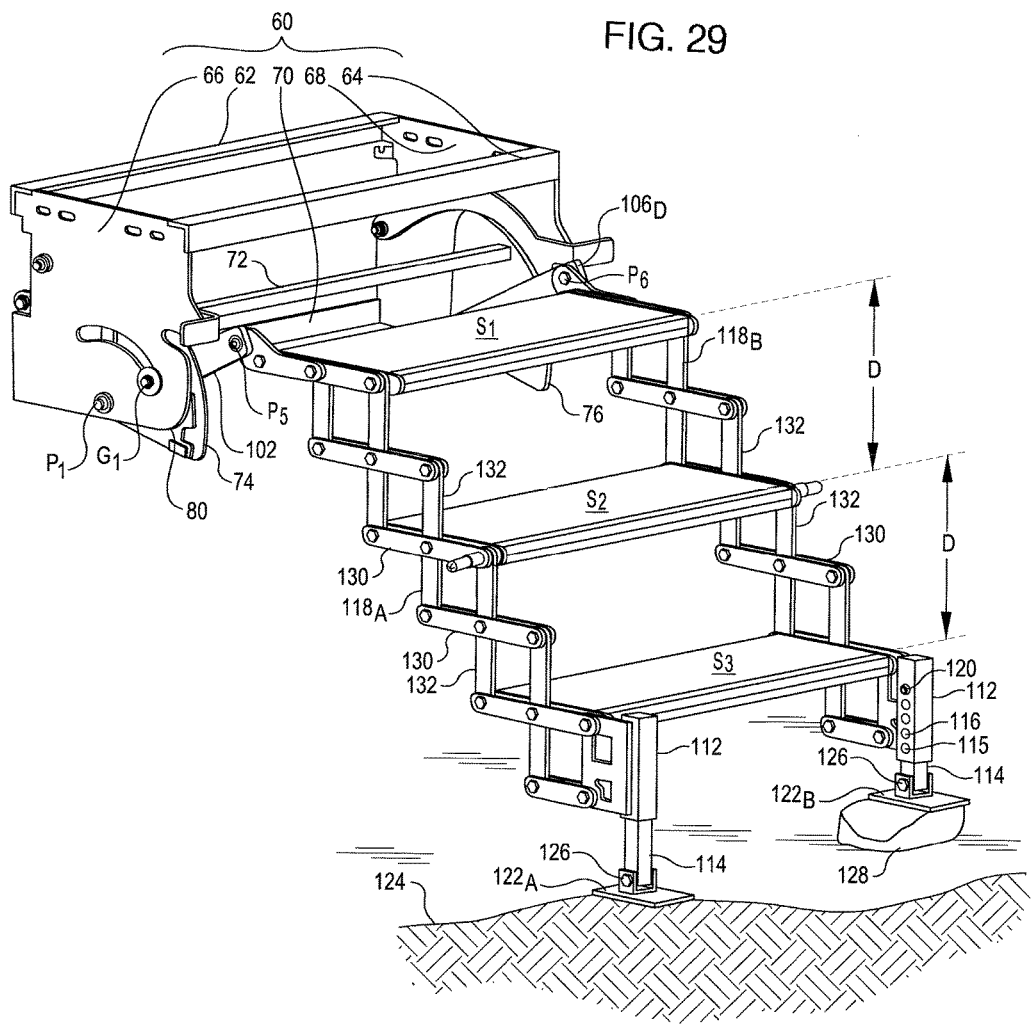

Still referring to FIG. 29, for ground support, a first extensible support leg 109A and second extensible support leg 109B may be provided. In various embodiments, the first extensible support leg 109A and the second extensible support leg 109B include an upper support member 112 having an interior channel defined by interior sidewalls 110, which provides a receiver for passage therethrough of a lower support member 114 which can be adjusted upwardly or downwardly as it nests in the upper support member 112. A plurality of holes 115 defined by edgewalls 116 in the upper tubular member 112 provides locking locations for detents 120 which may be spring loaded outwardly toward the upper tubular member 112, so that the height of the lower support member 114 is easily adjusted. The detents 120 are sized and shaped for close fitting mating engagement with each of the holes 115 in the upper support member 112. In an embodiment, the upper support member 112 may be provided in the configuration of a square tubular member.

As further seen in FIG. 29, extensible foot pads or plates $122_A$ and $122_B$ may be sized and shaped for transmitting a portion of a load from the stairs to a substrate 124 below (such as the ground or a parking lot) may be pivotably secured (at pivot 126) to the lower support member 114. In an embodiment, the foot pads 122A and 122B may be affixed to the lower support member 114 so that a majority of said substrate engaging surface of foot pad 122A and 122B is located inwardly toward the stairs, and thus away from first frame side 67 and from second frame side 69. Where uneven ground is encountered in a substrate 124, such as represented by rock 128, the overall extended height $H_{F1}$ of the first foot pad $122_A$ and the overall extended height of a second foot pad $122_B$ may be independently adjusted to assure firm support even though the substrate 124 includes uneven ground. The first extensible support leg $109_A$ is extendable to a selected height $H_{F1}$, and the second extensible support leg $109_B$ is extendable to a selected height $H_{F2}$. The first extensible support leg $109_A$ and the second extensible support leg $109_B$ are independently extendable, so that selected height $H_{F1}$ and selected height $H_{F2}$ may be the same or different.

Figure 18:
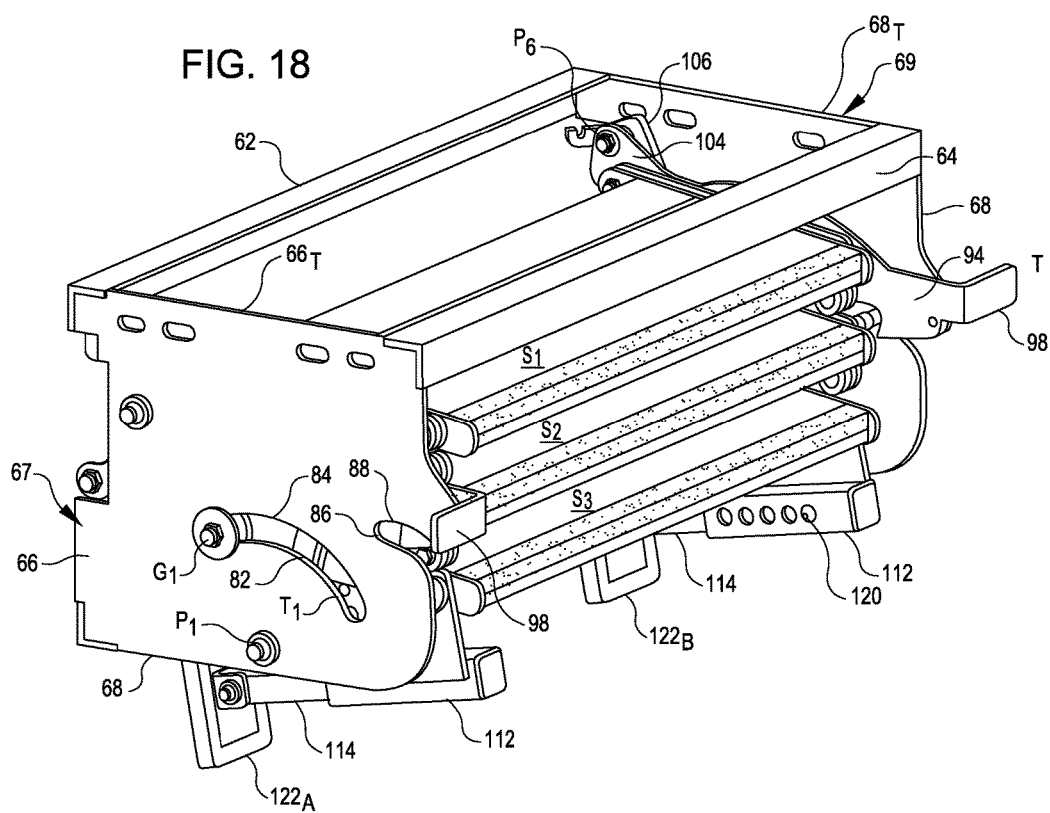
FIGS. 18 through 29 of the drawing are provided to illustrate the operation of an embodiment for a retractable stair system for a vehicle. At least a portion of the various components of retractable stair system may appear in various FIGS. 18 through 29, and thus the overall components of the retractable stair system are described to assist in understanding the various drawing figures. Generally, a frame is depicted including first and second upper longitudinal members which extend between first and second side plates. Also, the frame includes a third lower longitudinally extending member extending between the first and second side plates (see also FIG. 30). In these drawing FIGS. 18 through 29, a three step extensible-retractable scissors stairs assembly is provided disposed between a first keeper plate and a second keeper plate. Between a first keeper plate and a first slide plate is located a first indexing plate. Between a second keeper plate and a second slide plate is located a second indexing plate. A first latch is provided mounted for pivotable movement to allow releasable locking engagement of a latch tongue of the first latch with one of the plurality of tongue receiving recessed notches in the first indexing plate. A second latch is provided mounted for pivotable movement to allow releasable locking engagement of a latch tongue of the second latch with one of the plurality of tongue receiving recessed notches in the second indexing plate. The height of the uppermost step is adjustably positionable by selecting one level of the sets of companion notches in the indexing plates. A first longitudinal stiffener runs between the first latch and the second latch (see FIGS. 22-23). A second longitudinal stiffener runs between the first keeper plate and the second keeper plate (see FIGS. 22-27). The entire stair assembly is mounted for pivotable movement between first adaptor bracket and first flat bar arm, and between a second adaptor bracket and second flat bar arm. The first flat bar arm is pivotably mounted to the first side plate; the pivot extends through the first keeper plate and the first indexing plate. Likewise, the second flat bar arm is pivotably mounted to the second side plate; the pivot extends through the second keeper plate and the second indexing plate. The first flat bar arm has a first guide attached for arcuate movement in a guide track of the first side plate. The second flat bar arm has a second guide attached for arcuate movement in a guide track of the second side plate.

Further details of construction of an embodiment for a retractable stair assembly 54 will now be addressed. Attention is directed to FIG. 18, where an embodiment for a retractable stair system 54 is provided. The retractable stair system 54 includes a frame 60 having a first side plate 66 and a second side plate 68. The first 66 and second 68 side plates located at a first frame side 67 and at a second frame side 69, respectively, and spaced apart by one or more longitudinal structural members, for example first upper longitudinal member 62 and second upper longitudinal member 64. The first side plate 66 and the second side plate 68 each further include first edgewalls 82 defining an annular arc slide guide cutout 84 therein, and second edgewalls 86 defining a recessed latch finger cutout 88 therein.

Figure 19:
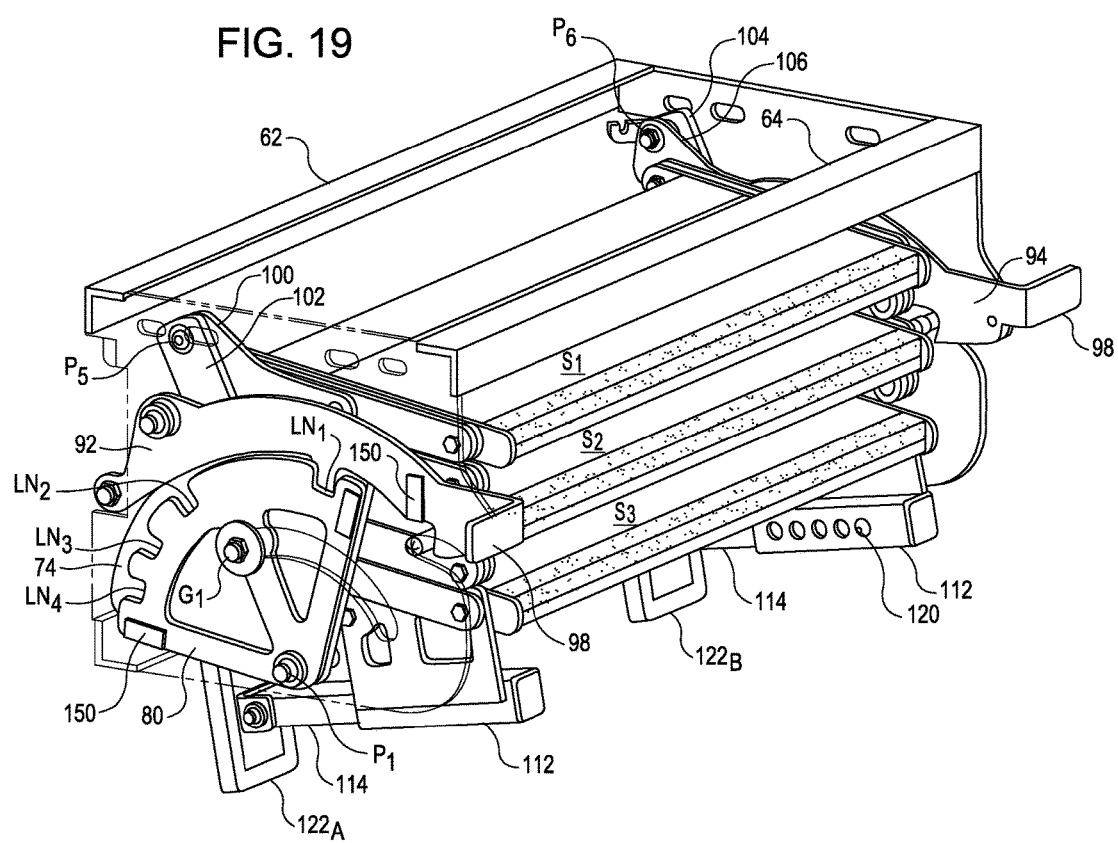

As better seen in FIG. 19 and following figures, and as may be further understood by reference to FIGS. 41A and 41B, a first keeper plate 74 and a second keeper plate 76 are provided, and are pivotally affixed to the said frame 60 at the first frame side 67 and at the second frame side 69. As may be more clearly understood by further reference to FIGS. 30, 32, and 34, the first keeper plate 74 is pivotally affixed at a first pivot $P_1$ on the first frame side 67, and the second keeper plate 76 is pivotally affixed at a second pivot $P_2$ on the second frame side 69.

Figure 40A:
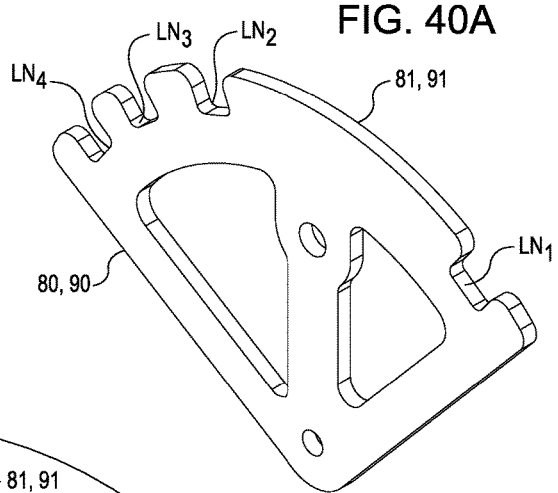
FIG. 40A provides a perspective view of an embodiment for an indexing plate, two of which are used to provide recessed notches for accepting locking latches at each side of the frame of the retractable stairs system.
Figure 40B:
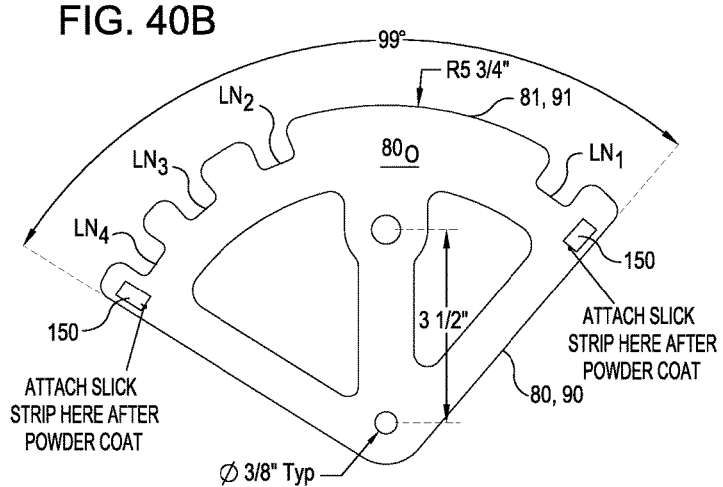
FIG. 40B provides a side view of an embodiment for an indexing plate.
Figure 40C:
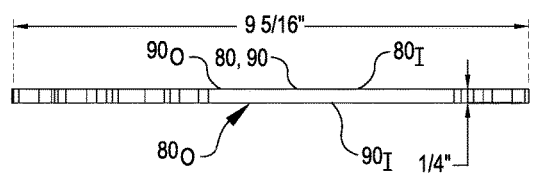
FIG. 40C provides a top view of an embodiment for an indexing plate.
Figure 40D:
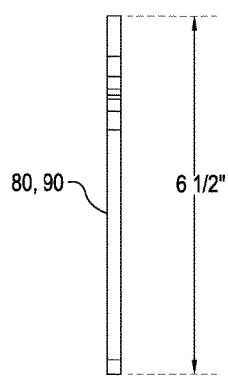
FIG. 40D provides a front end view of an embodiment for an indexing plate.

As may be understood by reference to FIGS. 19-25 and to FIGS. 40A and 40B, a first indexing plate 80 and a second indexing plate 90 are provided. The first indexing plate 80 and the second indexing plate 90 are pivotally affixed to the frame 60 at $P_1$ to first side plate 66 on first frame side 67 and at $P_2$ to second side plate 68 on the second frame side 69, respectively.

Each of the first indexing plate 80 and the second indexing plate 90 may include a generally arcuate upper surface 81 and 91, respectively. In the arcuate upper surface 81 and 91 of the first indexing plate and of the second indexing plate 90, a plurality of locking notches LN are provided downwardly recessed therein. In an embodiment, locking notches LN may be provided in a series of locking notches $LN_1$, $LN_2$, $LN_3$ and $LN_4$ as seen in FIGS. 19, 40A, and 40B. In an embodiment, a first locking notch $LN_1$ may be provided for use in locking the retractable-extensible scissors stairs assembly RSA in a stowed and locked position, as seen in FIGS. 4 and 19.

As seen in FIG. 19 and as may be further understood by reference to FIGS. 42A, 42B, 42C, and 42D, a first latch 92 and a second latch 94 are provided. The first latch 92 and the second latch 94 are pivotally affixed at a pivot necks $92_P$ and $94_P$ respectively via pivot $P_3$ and $P_4$, to frame 60 at first side plate 66 on first frame side 67 and at second side plate 68 on second frame side 69, respectively. The first latch 92 and the second latch 94 each further include a downwardly extending latch tongue $92_T$ and $94_T$, respectively, which is sized and shaped for interfitting locking engagement with locking notches LN (e.g., $LN_1$, $LN_2$, $LN_3$ and $LN_4$) in the first indexing plate 80 and in the second indexing plate 90, respectively. 15. In an embodiment, the first latch 92 and the second latch 94 may each include a body 93 and 95, respectively, which has a concave lower portion $92_C$ and $94_C$, respectively, from which their respective latch tongue $92_T$ or $94_T$ protrudes. In an embodiment, the concave lower portion $92_C$ and $94_C$ of first latch 92 and second latch 94, respectively, may substantially conform in shape to said arcuate upper surface 81 or 91 of the first indexing plate 80 or the second indexing plate 90, respectively. In an embodiment, the first latch 92 and the second latch 94 each may further have a distal end 92D or 94D, respectively, having a latch handle 98 thereon. In an embodiment, the latch handle 98 may be oriented substantially transverse to the body 93 or 95 of the first latch 92 and/or of the second latch 94, and in a direction outwardly from the first side plate 66 and/or the second side plate 68, respectively.

In an embodiment, a retractable stair system 54 may further include the use of at least one latch longitudinal stiffener 96. In such an embodiment, the least one latch longitudinal stiffener 96 extends between said first keeper plate and said second keeper plate; and In an embodiment, a retractable stair system 54 may further include the use of at least one latch longitudinal stiffener 96. In such an embodiment, the least one latch longitudinal stiffener 96 extends between a proximal end $92_X$ of the first latch 92 and a proximal end $94_X$ of the second latch 94. The at least one latch longitudinal stiffener 96 provides for coordination of movement between first latch 92 and second latch 94, so that movement of either the first latch 92 or of the second latch 94 is transferred to the other.

Similarly, a retractable stair system 54 may further include at least one keeper longitudinal stiffener 72. The at least one keeper longitudinal stiffener 72 is oriented to extend across the retractable stair system 54 between the first keeper plate 74 and the second keeper plate 76. In order to assure locking, the keeper longitudinal stiffener 72 is sized and shaped to keep the first 74 and second 76 keeper plates against or at least adjacent the first 80 and second 90 indexing plates, respectively, sufficiently so that slippage of latch tongue 92T of the first latch 92 with respect to the first indexing plate 80, and of the latch tongue 94T of said second latch 94 with respect to the second indexing plate 90 when the latch tongue 92T of the first latch 92, and the latch tongue 94T of the second latch 94, are latched in one of said recessed locking notches LN in the first indexing plate 80 and in the second indexing plate 90, respectively.

Figure 2:
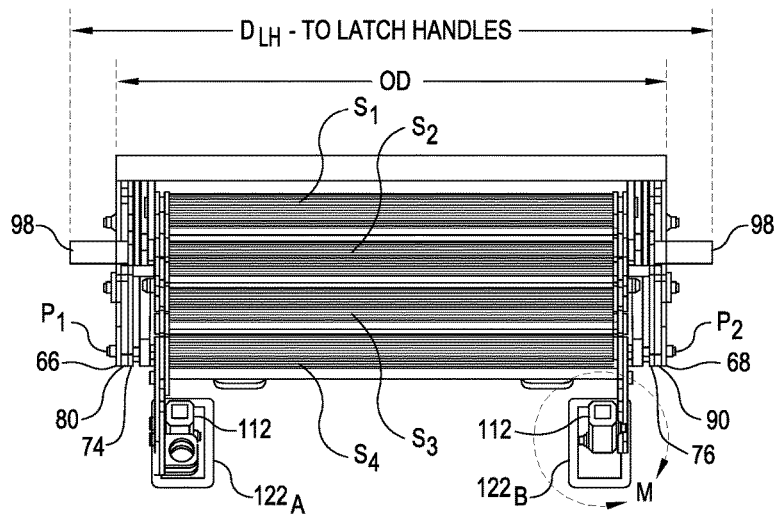
FIG. 2 is an elevation view of an embodiment for a retractable stair system as just depicted in FIG. 1 above, and in which four stair steps are retracted into the mounting frame.
Figure 8:
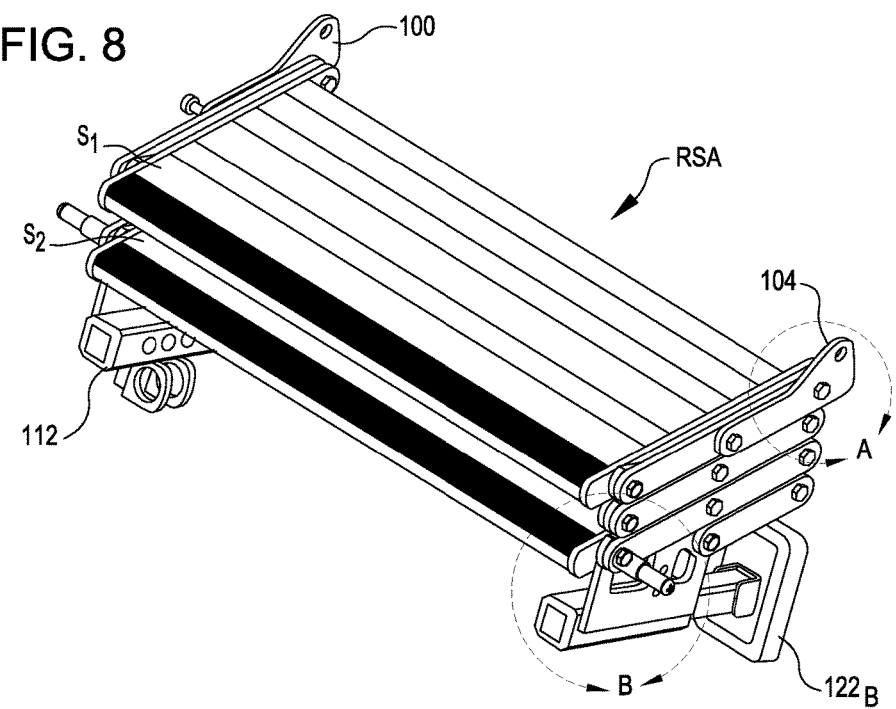
FIG. 8 is a perspective view of portions of an embodiment for a retractable stair system as just depicted in FIGS. 6 and 7 above, and in which two stair steps are depicted in a retracted position, and further showing first and second adapter brackets which are used to mount the extensible-retractable scissors stair assembly to a frame.
Figure 9:
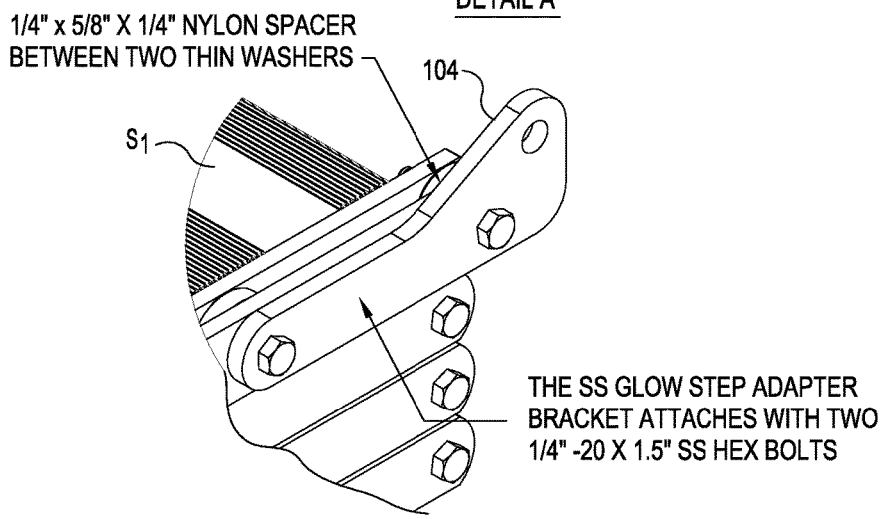
FIG. 9 is an enlarged perspective view of a detail (Detail A from FIG. 8) of an embodiment for portions of an adapter bracket, and depicting, in part, hardware used in assembly, including use of a nylon spacer between two thin washers.
Figure 10:
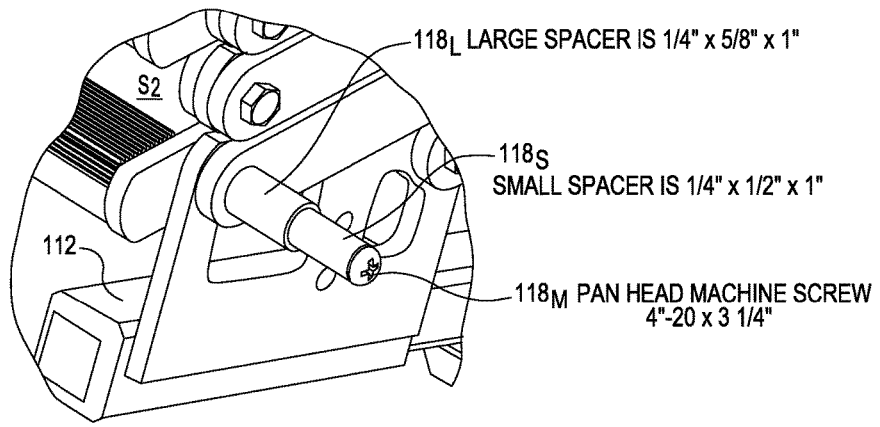
FIG. 10 is an enlarged perspective view of a detail (Detail B from FIG. 8) of an embodiment for portions of a first end of a latch pipe, and depicting, in part, hardware used in assembly.
Figure 11:
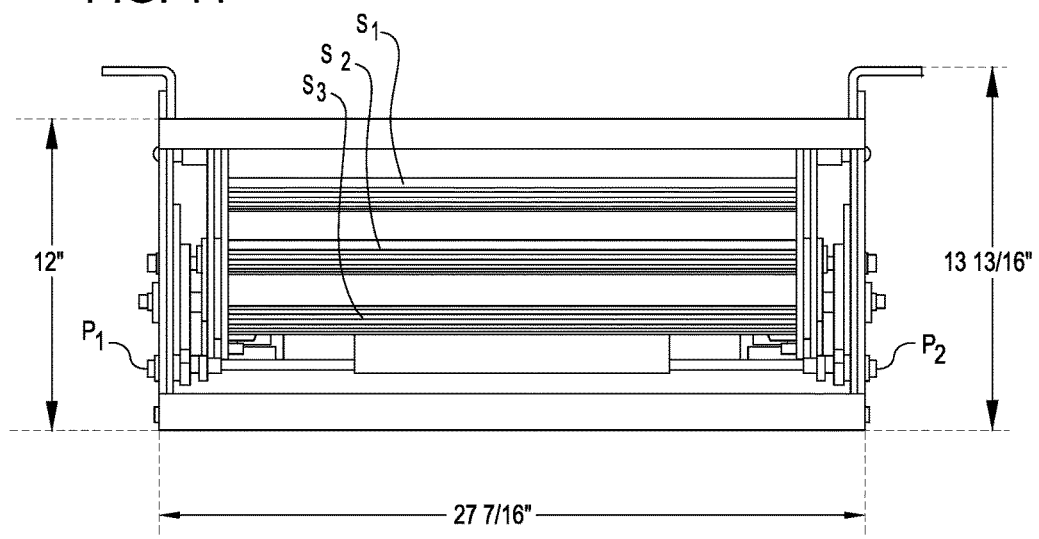
FIG. 11 is an elevation view of an embodiment for a retractable stair system similar to that just depicted in FIGS. 1 and 6 above, but now showing a retractable stair system embodiment in which three stair steps are retracted into the mounting frame.
Figure 12:
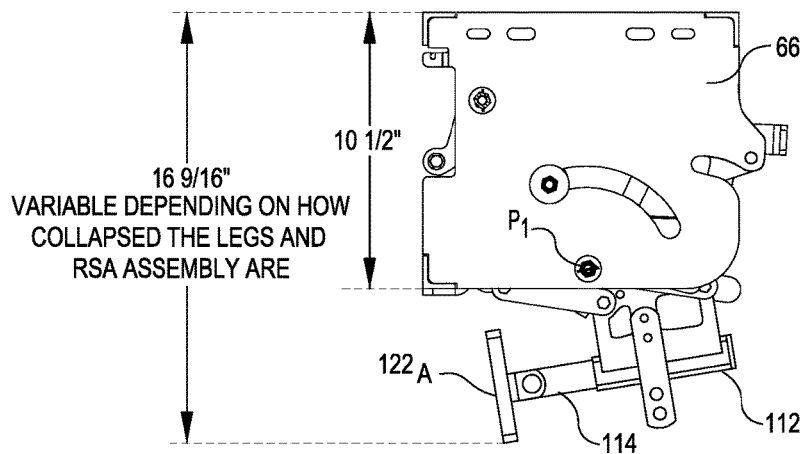
FIG. 12 is a side elevation view of an embodiment for a retractable stair system as just depicted in FIG. 11 above, now showing a retractable stair system embodiment depicted as if the three stair steps are retracted into at least a portion of the frame and substantially between opposing first and second slide plates.
Figure 13:
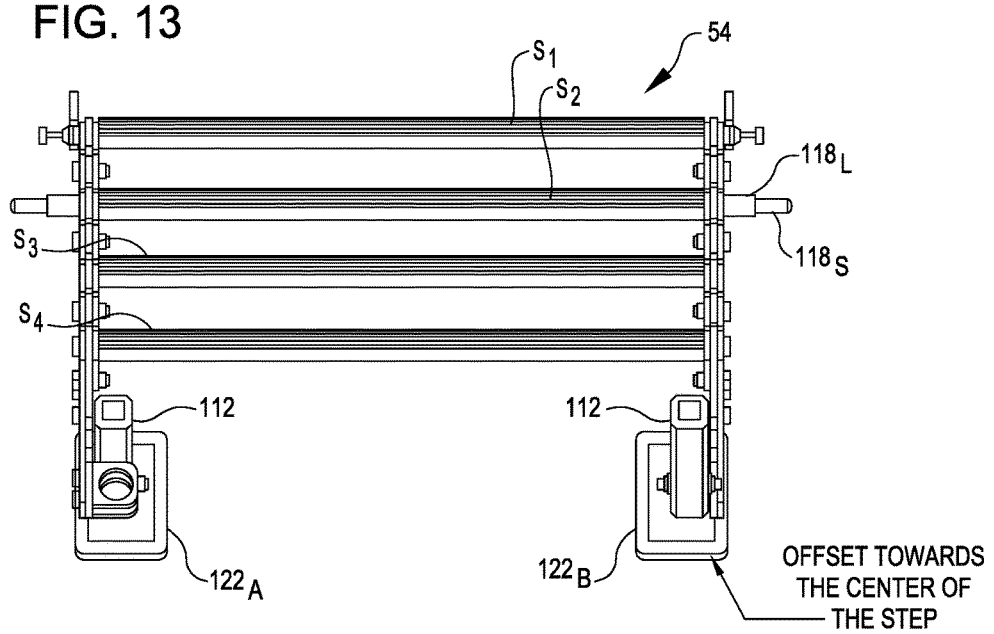
FIG. 13 is an elevation view of an embodiment for portions of a retractable stair system similar to that just depicted in FIGS. 1, 6, and 11 above, but now showing a retractable stair system embodiment in which four stair steps are provided.
Figure 14:
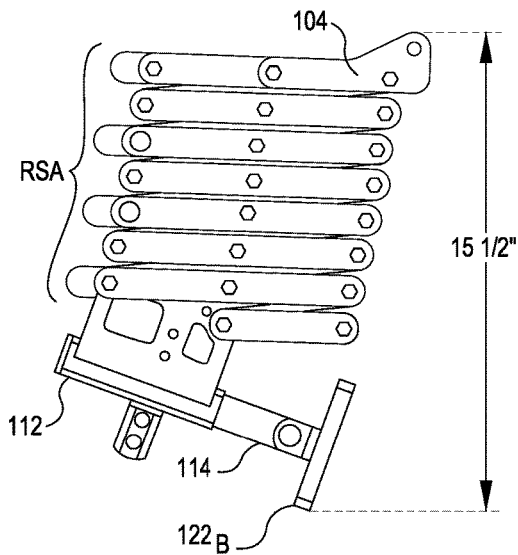
FIG. 14 is a side elevation view of an embodiment for portions of a retractable stair system as just depicted in FIG. 13 above, now showing a retractable stair system embodiment depicted in a compact arrangement as if the four stair steps were retracted into at least a portion of the frame and substantially between opposing first and second slide plates.
Figure 15:
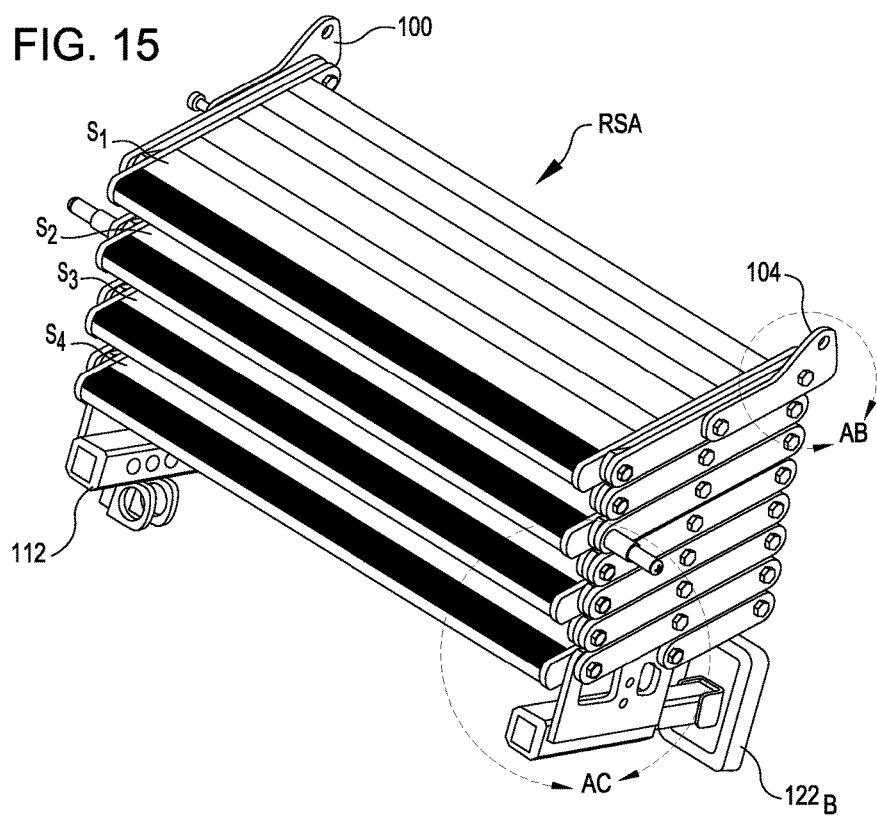
FIG. 15 is a perspective view of an embodiment for a retractable stair system as just depicted in FIGS. 13 and 14 above, and in which four stair steps are shown in a retracted position, and further showing first and second adapter brackets which are used to mount the extensible-retractable scissors stair assembly to a frame (not shown in FIG. 15).
Figure 16:
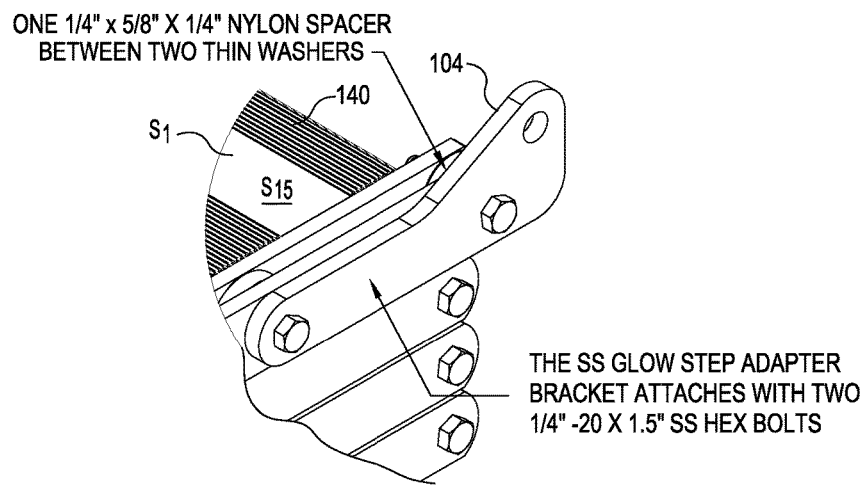
FIG. 16 is an enlarged perspective view of a detail (Detail AB from FIG. 15) for portions of an embodiment for an adapter bracket, and depicting, in part, hardware which may be used in assembly, including a nylon spacer between two thin washers.
Figure 17:
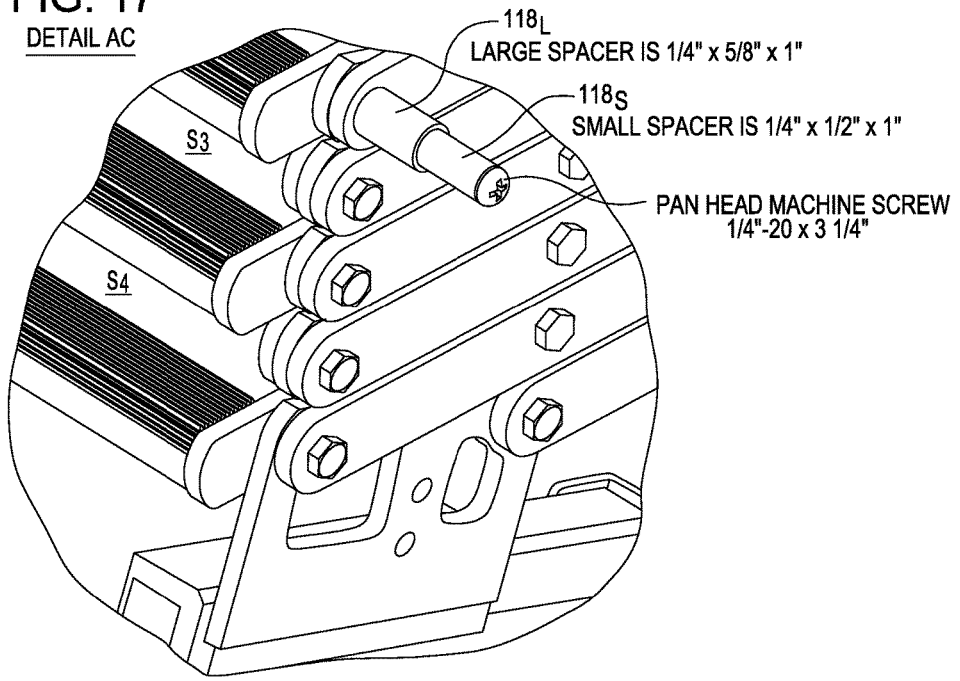
FIG. 17 is an exploded perspective view of a detail (Detail AC from FIG. 15) for portions of an embodiment for the first end of a latch pipe, and depicting, in part, hardware which may be used in assembly.

In an embodiment, a retractable stair system 54 may further include a latch pipe 108 having first a first end $108_A$ and a second end $108_B$. The first end $108_A$ and the second end $108_B$ of the latch pipe 108 are configured for secure mating engagement with the recessed latch finger cutout 88 defined by sidewalls 86 in the first side plate 66 and in the second side plate 68. In this manner, the latch pipe 108 vertically supports the extensible-retractable scissors stair assembly RSA when the extensible-retractable stair assembly RSA is placed in a storage position as shown in FIG. 2, 4, or 19. In an embodiment, the latch pipe 108 may be provided using a material with adequate strength properties for the service (e.g., inch schedule 40 pipe). In an embodiment, the latch pipe 108 may be provided in a selected stainless steel. Various fabrication techniques such as use of welding in a jig may be selected by those of skill in the art and to whom this disclosure is directed, without need for additional details. However, attention is drawn to FIG. 10, showing Detail B of FIG. 8, which further illustrates assembly location and identifies suitable additional components such as large spacer $118_L$ and small spacer $118_S$, as well as use of suggested hardware including capping the ends $108_A$ and $108_B$ with a pan head machine screw $118_M$. One latch pipe 108 may be provided for each retractable stair system 54.

Figure 26:
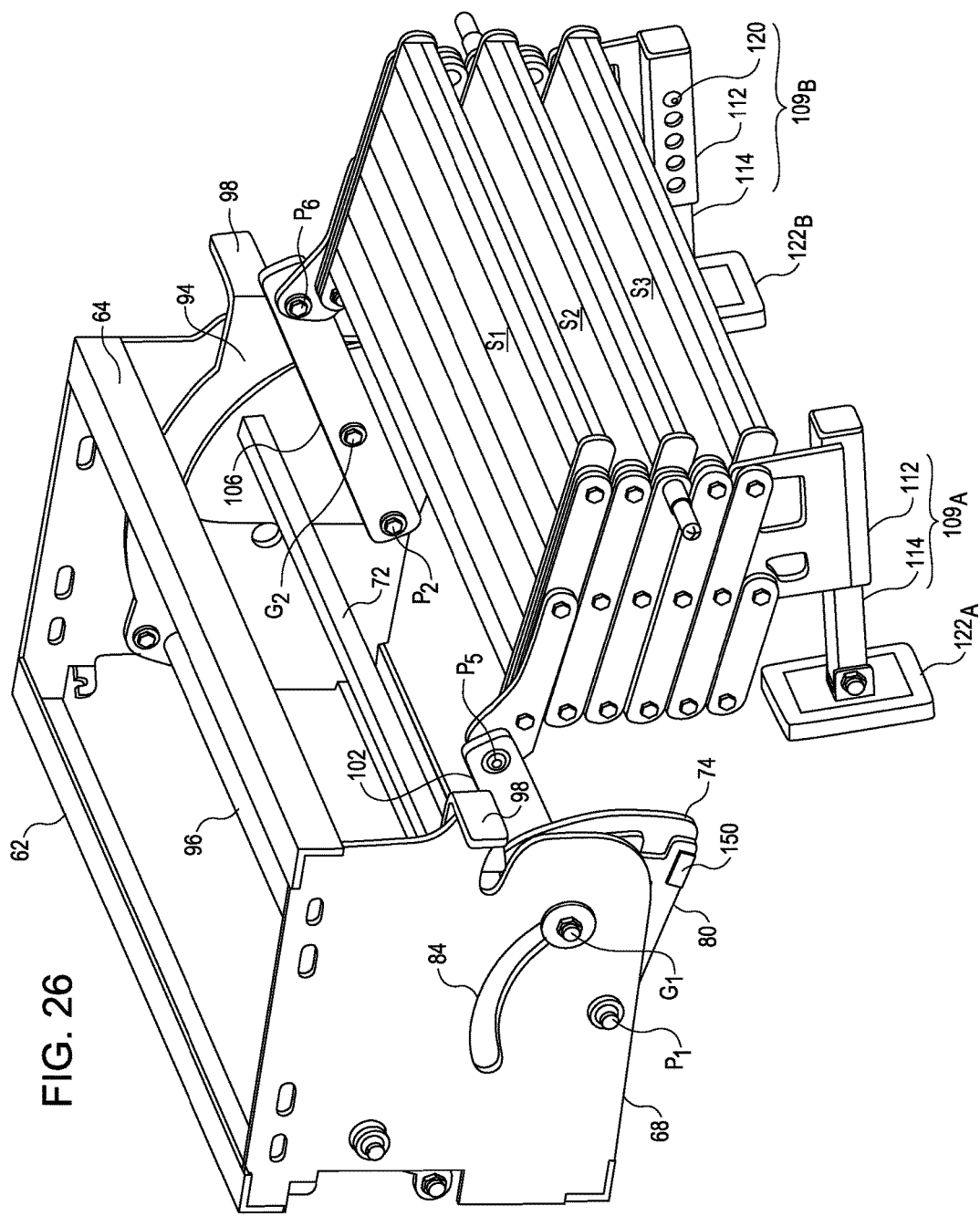
Figure 27:
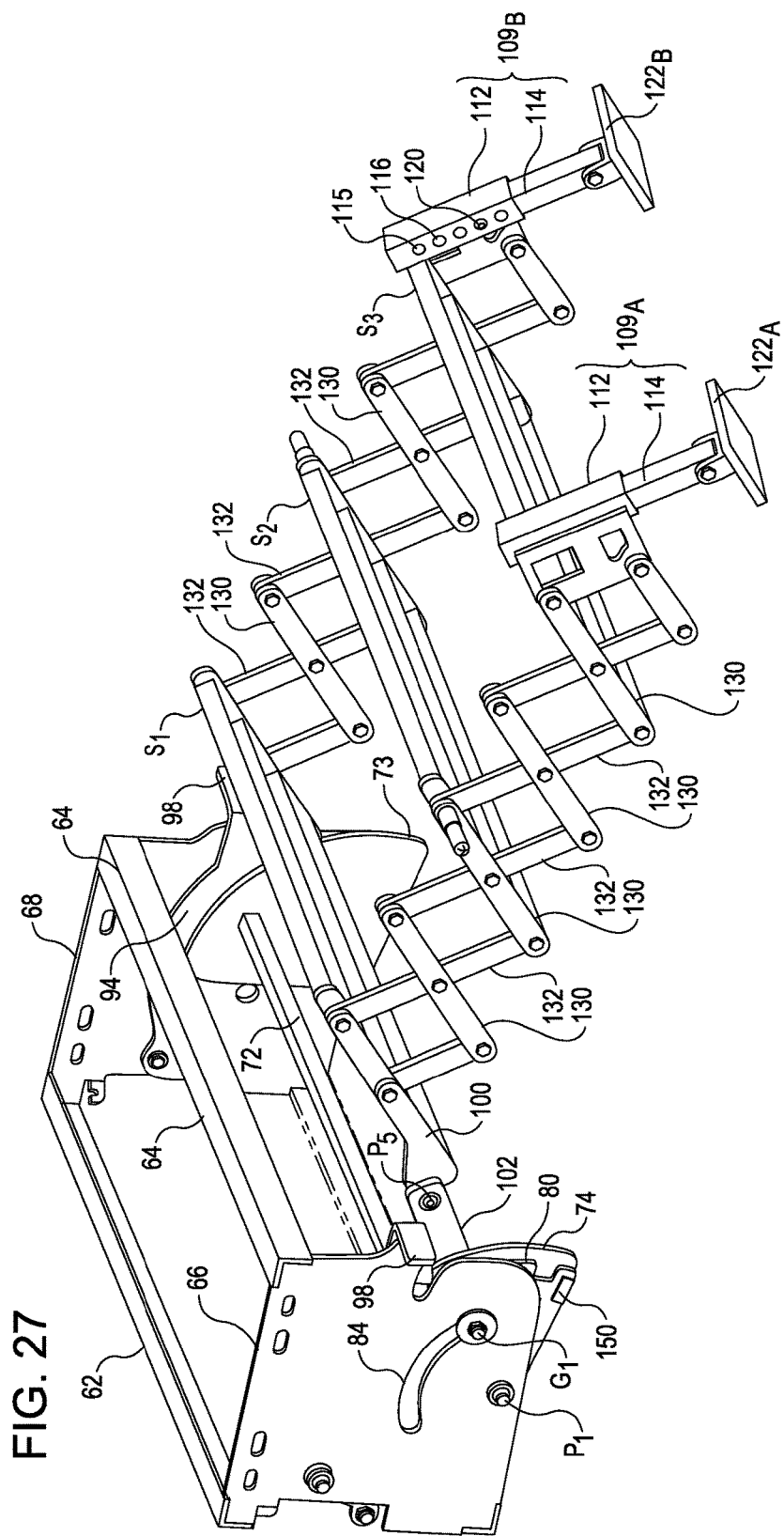
Figure 44D:
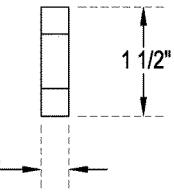
FIG. 44D provides an end view of an embodiment for a flat bar arm.
Figure 44A:
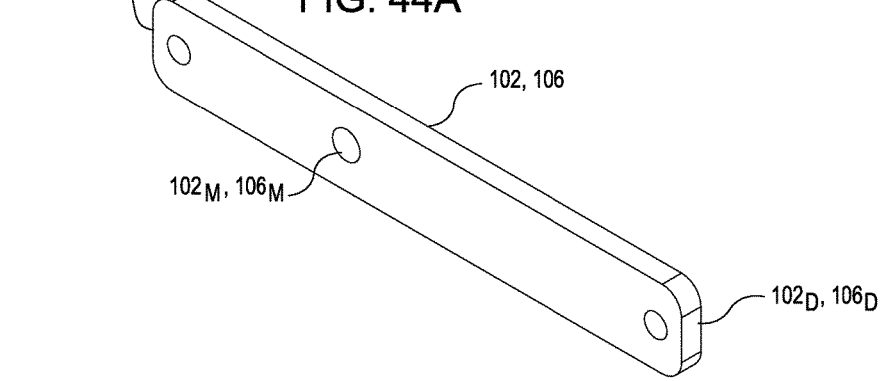
FIG. 44A provides a perspective view of an embodiment for a flat bar arm, used to mount an extensible-retractable scissors stairs assembly to a keeper plate.
Figure 44B:
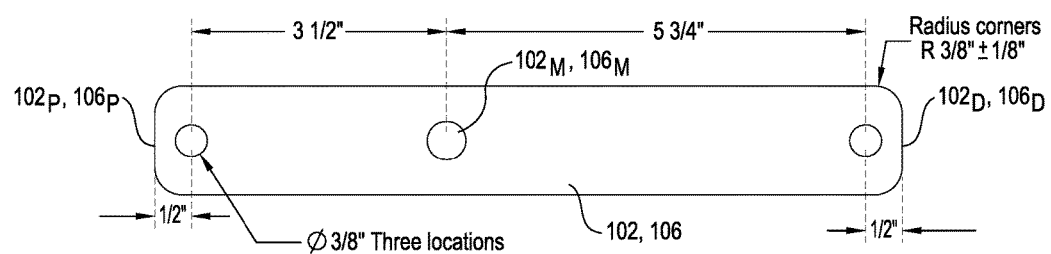
FIG. 44B provides a side view of an embodiment for a flat bar arm.
Figure 44C:
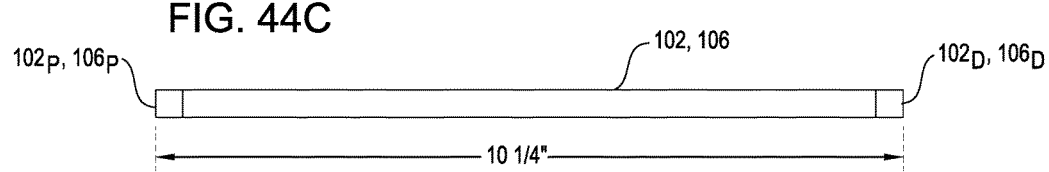

Attention is directed to FIG. 26, which provides details which may be utilized in an embodiment of a retractable stair system 54 for attachment of the extensible-retractable stair assembly RSA to the frame 60 via first keeper plate 74 and second keeper plate 76. As noted above, in an embodiment, the entire retractable stair assembly RSA may be mounted for pivotable movement between first adaptor bracket 100 and first flat bar arm 102, and between a second adaptor bracket 104 and second flat bar arm 106 (see FIG. 19). Note that a first flat bar arm 102 is pivotally mounted to the first side plate 66 at pivot $P_1$, which extends through the first keeper plate 74 and the first indexing plate 80. Likewise, the second flat bar arm 106 is pivotably mounted to the second side plate 68; a pivot $P_2$ extends through the second keeper plate 76 and the second indexing plate 90. The first flat bar arm 102 has a first guide $G_1$ attached for arcuate movement in guide track $T_1$ which may be defined by an annular arc shaped slide guide 84 which may be in the shape of an annular arc shaped slide guide 84 as defined by first edgewalls 82 in the first side plate 66. The second flat bar arm 106 has a second guide $G_2$ attached for arcuate movement in a guide track $T_2$ which may be in the shape of an annular arc shaped slide guide 84 as defined by first edgewalls 82 in the second side plate 68. The guides $G_1$ and $G_2$ may be attached through a medial hole $102_M$ in the first flat bar arm 102 and a medial hole $106_M$ in the second flat bar arm 106, respectively, as may be appreciated by reviewing FIGS. 44A and 44B. Thus, the first flat bar arm 102 has a proximal end $102_P$ which is securely attached at the first keeper plate 74 and configured for pivoting motion about pivot $P_1$. Likewise, the second flat bar arm 106 has a proximal end $106_P$ which is securely attached at the first keeper plate 74 and configured for pivoting motion about pivot $P_1$. The first flat bar arm 102 and the second flat bar arm 106 are configured for arcuate movement in concert with the first keeper plate 74 and the second keeper plate 76, respectively. The first flat bar arm 102 has a distal end $102_D$ that extends outwardly from the first keeper plate 74. The second flat bar arm 106 has a distal end $106_D$ that extends outwardly from the second keeper plate 76.

Figure 25:
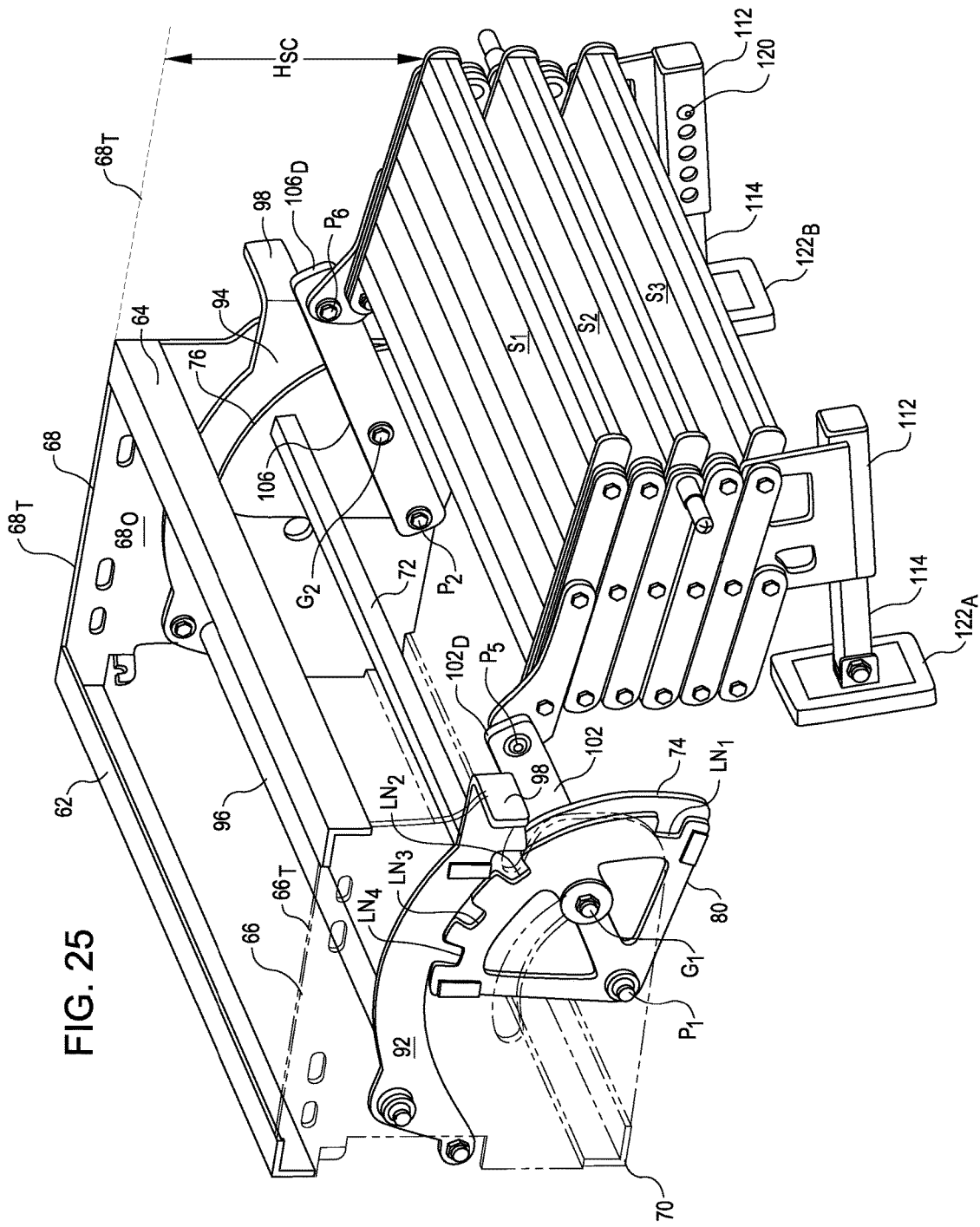

As seen in FIGS. 19 and 25, a retractable stair system 54 may be provided where the extensible-retractable stair assembly RSA is attached at pivots $P_5$ and $P_6$ at or near the distal ends $102_D$ and $106_D$ of first flat bar arm 102 and second flat bar arm 106, respectively to the first adapter bracket 100 and to the second adapter bracket 104. In an embodiment, the first adapter bracket 100 includes a proximal end $100_P$ which is pivotally attached at or near the distal end $102_D$ of the first flat bar arm 102. The first adapter bracket 100 also includes a distal end $100_D$ that extends outwardly from the first flat bar arm 102. In an embodiment, the second adapter bracket 104 includes a proximal end $104_P$ which is pivotally attached at or near the distal end $106_D$ of the second flat bar arm 106. The second adapter bracket 104 also includes a distal end $104_D$ that extends outwardly from the second flat bar arm 106. In an embodiment, the first adapter bracket 100 and the second adapter bracket 104 each includes a generally L-shaped ear portion $100_E$ or $104_E$, respectively, at said proximal end $100_P$ or $104_P$, respectively. In such an embodiment, the first adapter bracket 100 is pivotally attached to the first flat bar arm 102 at the ear shaped portion $100_E$ of the first adapter bracket 100. Likewise, the second adapter bracket 104 is pivotally attached to the second flat bar arm 106 at the ear shaped portion $104_E$ of the second adapter bracket 104.

Figure 28:
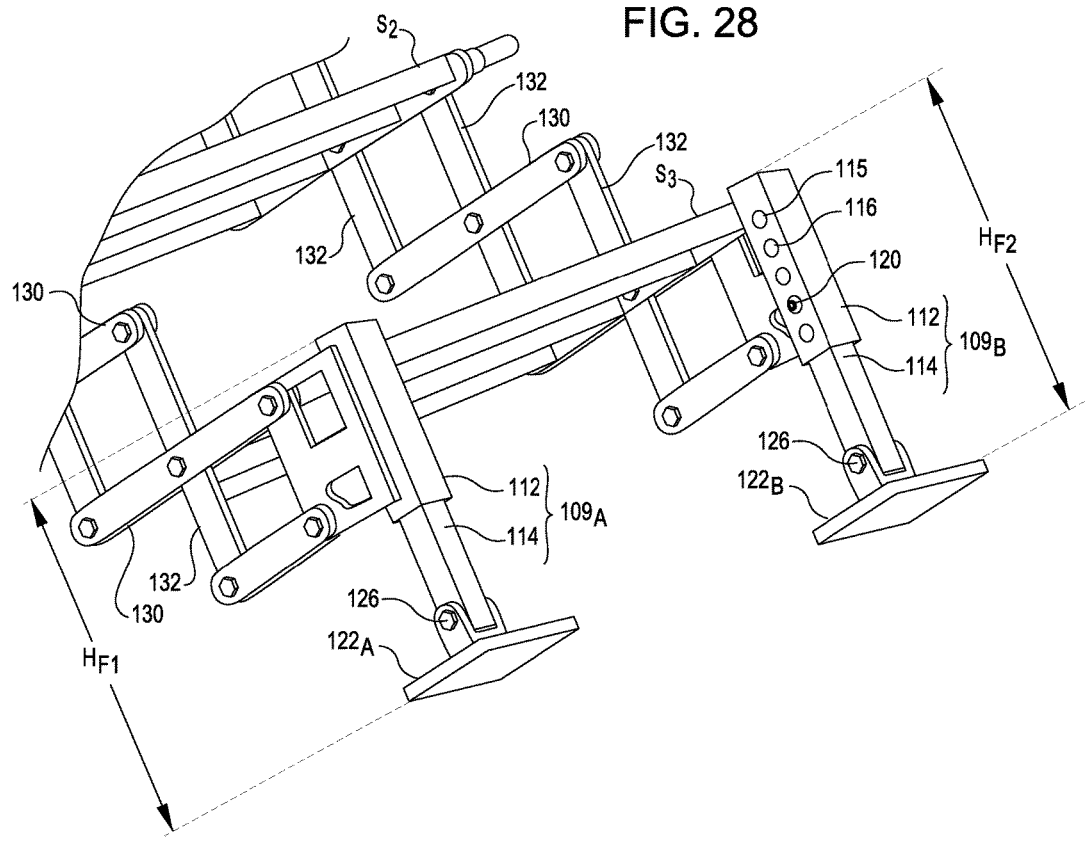

As seen in FIGS. 19 and 29, a retractable stair system 54 may be provided which includes an extensible-retractable scissors stair assembly RSA. The extensible-retractable stair assembly RSA includes a first scissors assembly $118_A$ and a second scissors assembly $118_B$. The first scissors assembly $118_A$ and the second scissors assembly $118_B$ are affixed to the first adapter bracket 100 and to the second adapter bracket 104, respectively. In an embodiment, the first scissors assembly $118_A$ and the second scissors assembly $118_B$ each includes a plurality of outward elements 130 (which when extended may be oriented substantially horizontally) and a plurality of downward elements 132 (which when extended may be oriented substantially vertically). Suitable means for providing the first scissors assembly $118_A$ and the second scissors assembly $118_B$ are set out in various drawing figures, such as FIGS. 27, 28, and 29. The first scissors assembly $118_A$ and the second scissors assembly $118_B$ are spaced apart by a number N of stairs S in a series of stairs $S_1$ to $S_N$, wherein N is a positive integer between two and six inclusive, and wherein each of the stairs S is securely affixed between selected outward elements of the first scissors assembly $118_A$ and the second scissors assembly $118_B$. As seen in FIGS. 9, 16, 18, 22, one or more of the stairs S in the series of stairs $S_1$ to $S_N$ further includes an upper surface $S_{1S}$, $S_{2S}$, etc., which includes thereon a non-skid surface portion 140.

Figure 20:
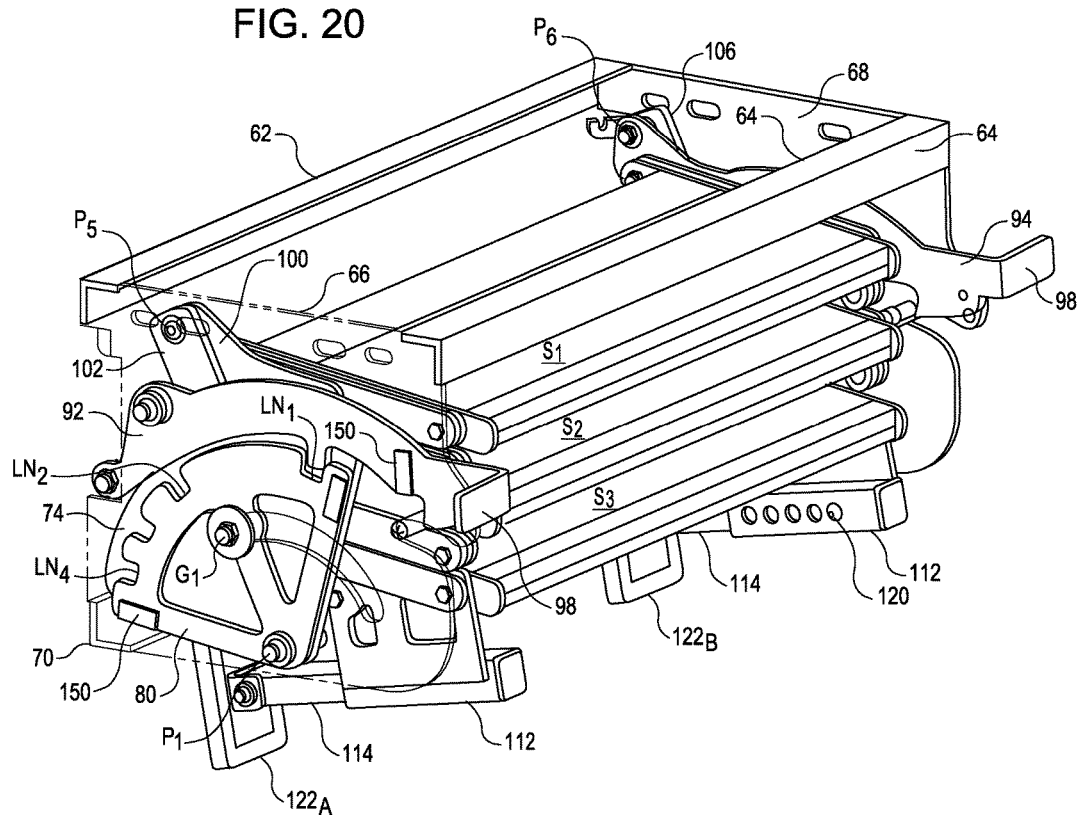
Figure 21:
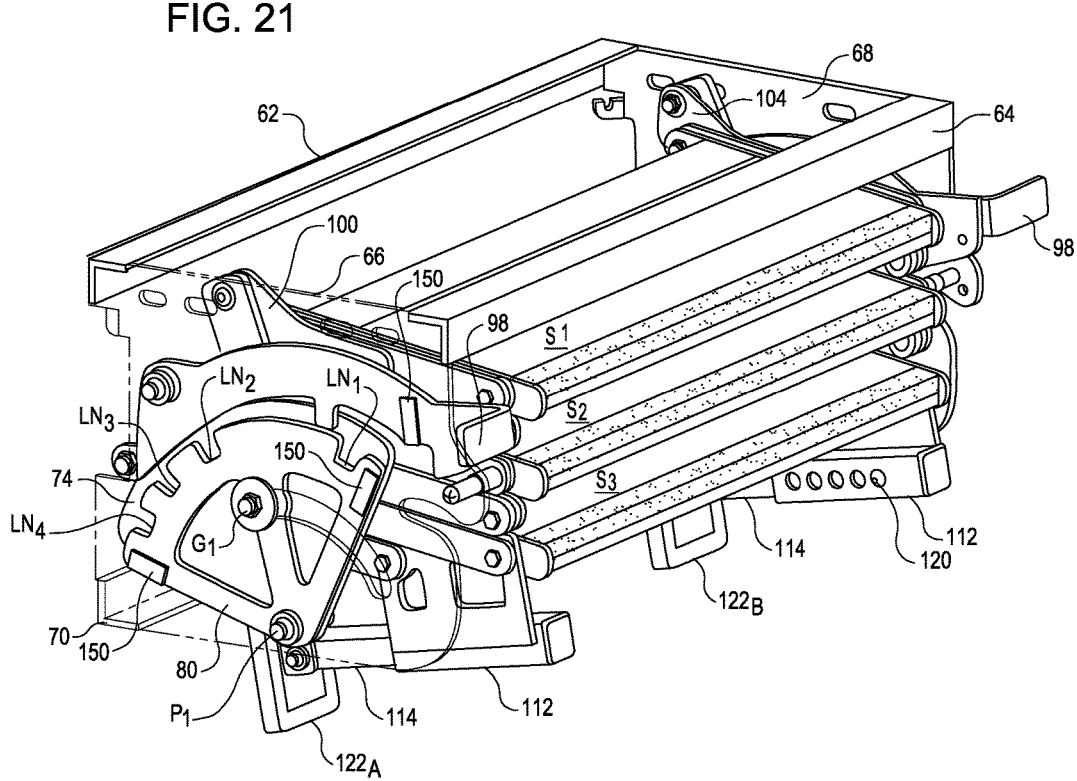
Figure 42A:
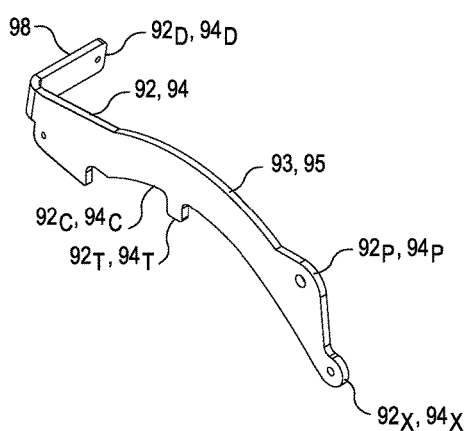
FIG. 42A provides a perspective view for a latch handle, two of which are used to provide latches with latch tongues for locking engagement with recessed notches in indexing plates at both first and second sides of a frame for the extensible-retractable scissors stairs assembly.
Figure 42B:
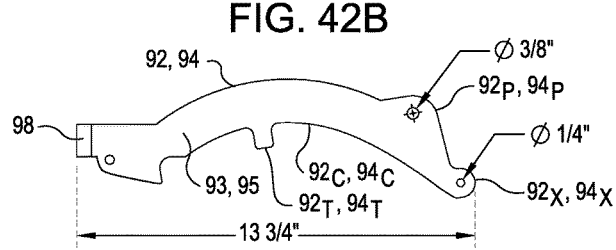
FIG. 42B provides a side view of an embodiment for a latch handle.
Figure 42C:
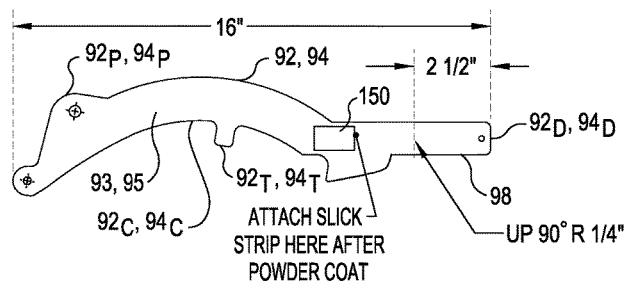
FIG. 42C provides a side view of an embodiment for a latch handle, before final fabrication by bending the handle ninety degrees.
Figure 42D:
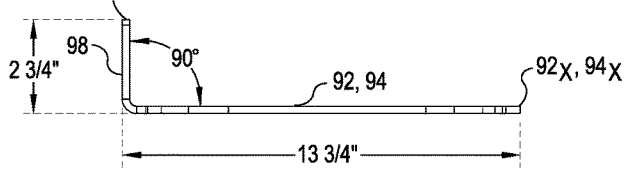
FIG. 42D provides a top view of an embodiment for a latch handle.
Figure 42E:
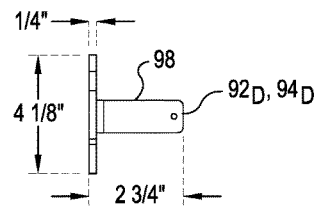
FIG. 42E provides an end view of an embodiment for a latch handle.

Attention is now directed to FIGS. 21, 22, and 40B, and 42C. In order to provide easy deployment and stowage of the extensible-retractable stair assembly RSA, the first indexing plate 80, the second indexing plate 90 may be provided with low friction surface pads 150. In an embodiment, the first indexing plate 80 has an outer side $80_O$ and an inner side $80_I$. Low friction surface pads 150 are affixed to the outer side $80_O$ of the first indexing plate 80. This technique decreases the friction between inner side $66_I$ of the first side plate 66 and the outer side $80_O$ of the first indexing plate 80, to facilitate arcuate movement of the first indexing plate 80 with respect to the first side plate 66. For the same reasons, the second indexing plate 90, may be provided with low friction surface pads 150. In an embodiment, the second indexing plate 90 has an outer side $90_O$ and an inner side $90_I$. Low friction surface pads 150 are affixed to the outer side $90_O$ of the second indexing plate 90. This technique decreases the friction between inner side 68I of the second side plate 68 and the outer side $90_O$ of the second indexing plate 90, to facilitate arcuate movement of the second indexing plate 90 with respect to the second side plate 68. As seen in FIGS. 20 and 42C, for the same reasons, an inward side of first latch 92 and of second latch 94 may also be provided with a strip of low friction surface pad 150.

In operation, the retractable stair assembly 54 is adjusted via the moving the first 92 and second 94 latches to remove latch tongues $92_T$ and $94_T$ from the then utilized working recessed locking notch LN in the respective first indexing plate 80 and in the second indexing plate 90. This can be seen in the series of drawing figures, namely FIGS. 19 through 25. The first side plate 66 has a top $66_T$, and the second side plate has a top $68_T$. In an embodiment, the adjustment of the latch tongue 92T of the first latch 92 and of the latch tongue $94_T$ of the second latch 94 to one of the plurality of working recessed locking notches LN adjusts said stair $S_1$ to a height $H_S$ below the top $66_T$ of the first side plate 66 and below the top $68_T$ of the second side plate 68.

In an embodiment, as seen in FIG. 19, wherein the first 80 and second 90 indexing plates include a first recessed locking notch $LN_1$, a second recessed locking notch $LN_2$, a third recessed locking notch $LN_3$, and a fourth recessed locking notch $LN_4$, the placement of the latch tongues $92_T$ and $94_T$ in the first locking notch $LN_1$ may be used to secure the retractable stair system 54 in a secure stair $S_1$ in a stowed position, wherein the stair $S_1$ is substantially secured between the first side plate 66 and the second side plate 68.

Figure 22:
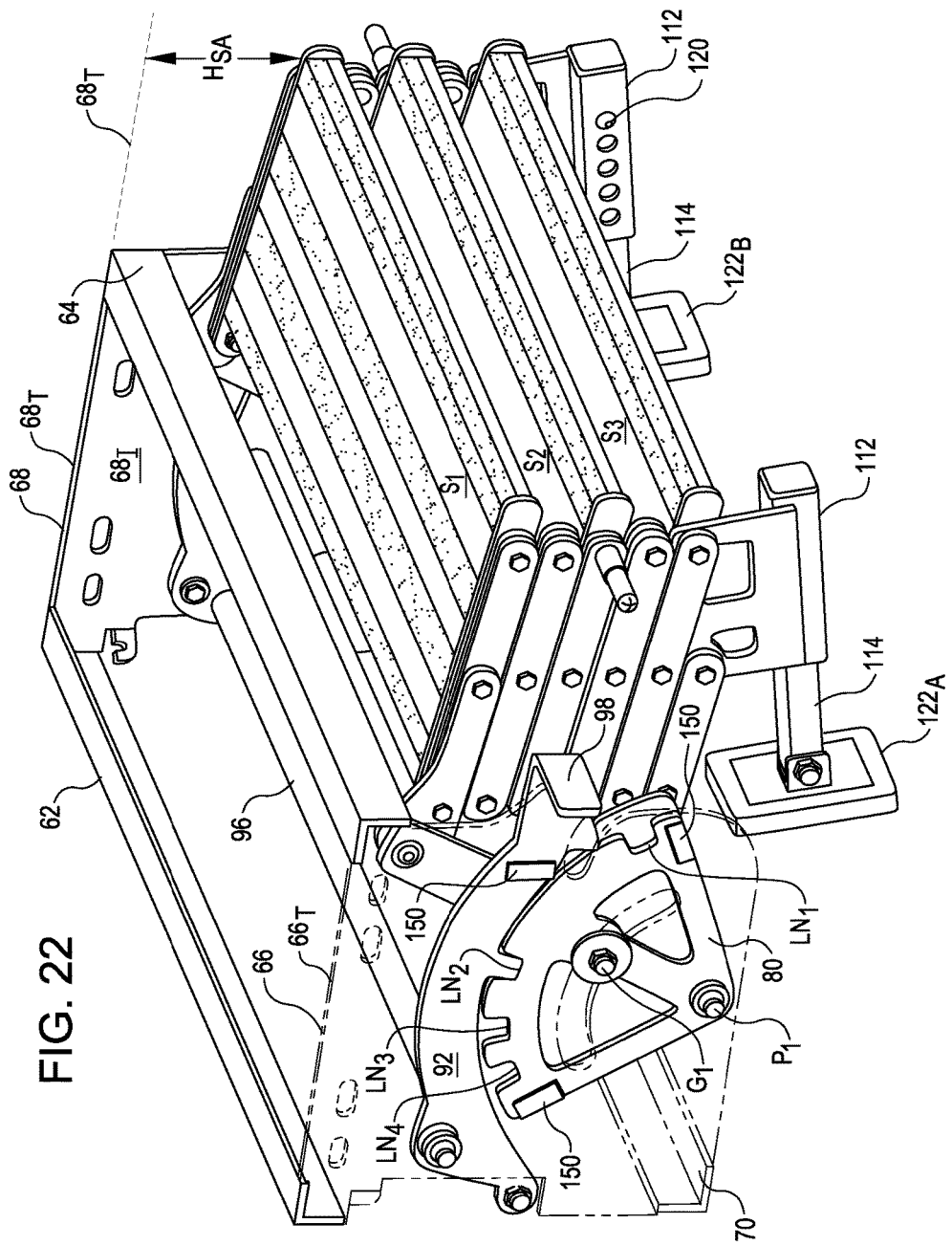
Figure 23:
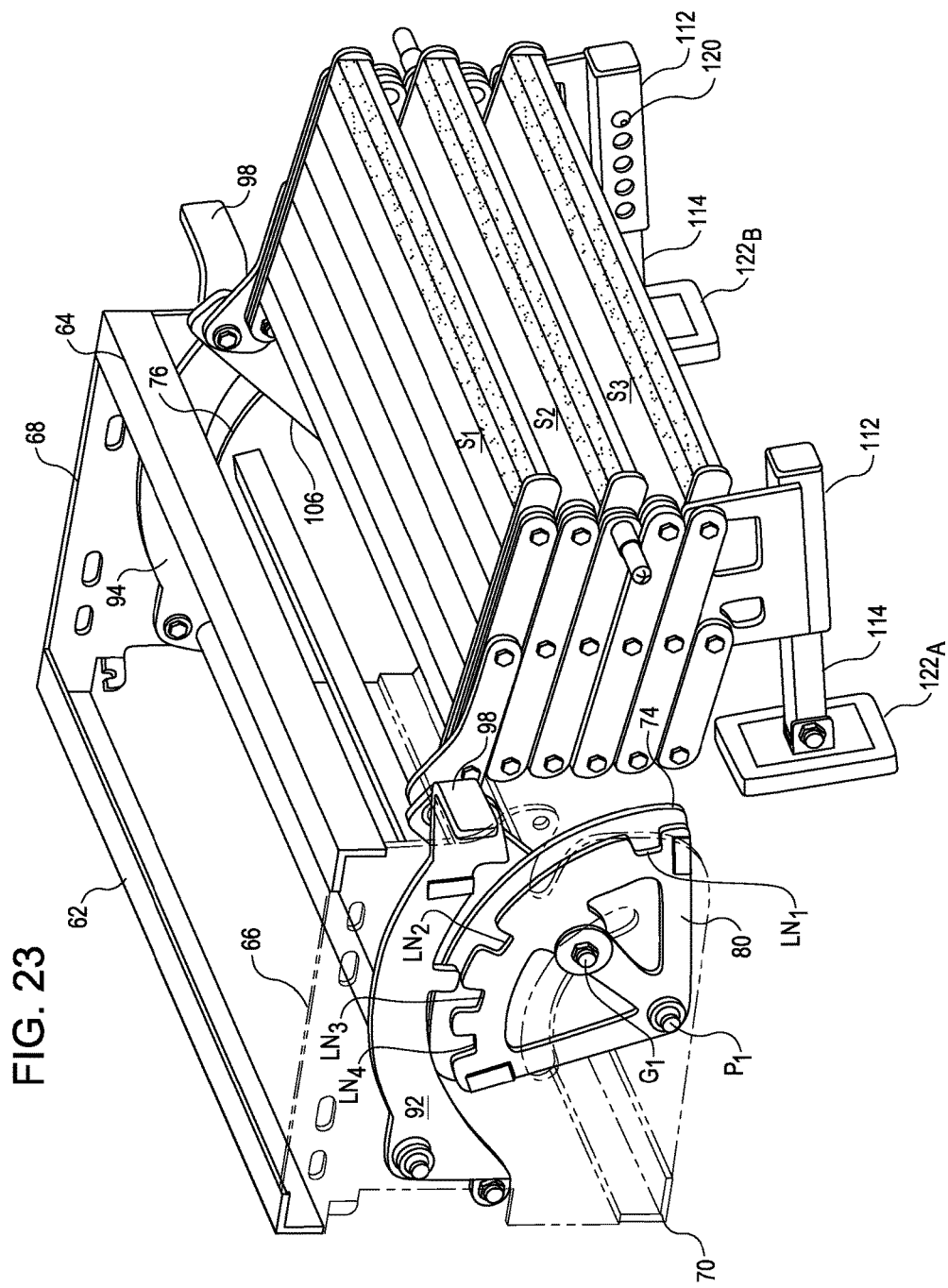

In an embodiment, as seen in FIG. 22, wherein the first 80 and second 90 indexing plates include a first recessed locking notch $LN_1$, a second recessed locking notch $LN_2$, a third recessed locking notch $LN_3$, and a fourth recessed locking notch $LN_4$, the placement of the latch tongues $92_T$ and $94_T$ in the second locking notch $LN_2$ may be used to secure the retractable stair system 54 in a first stair height configuration, wherein the stair $S_1$ is adjusted to a height $H_{SA}$ below the top $66_T$ of said first side plate 66 and below the top $68_T$ of the second side plate 68.

Figure 24:
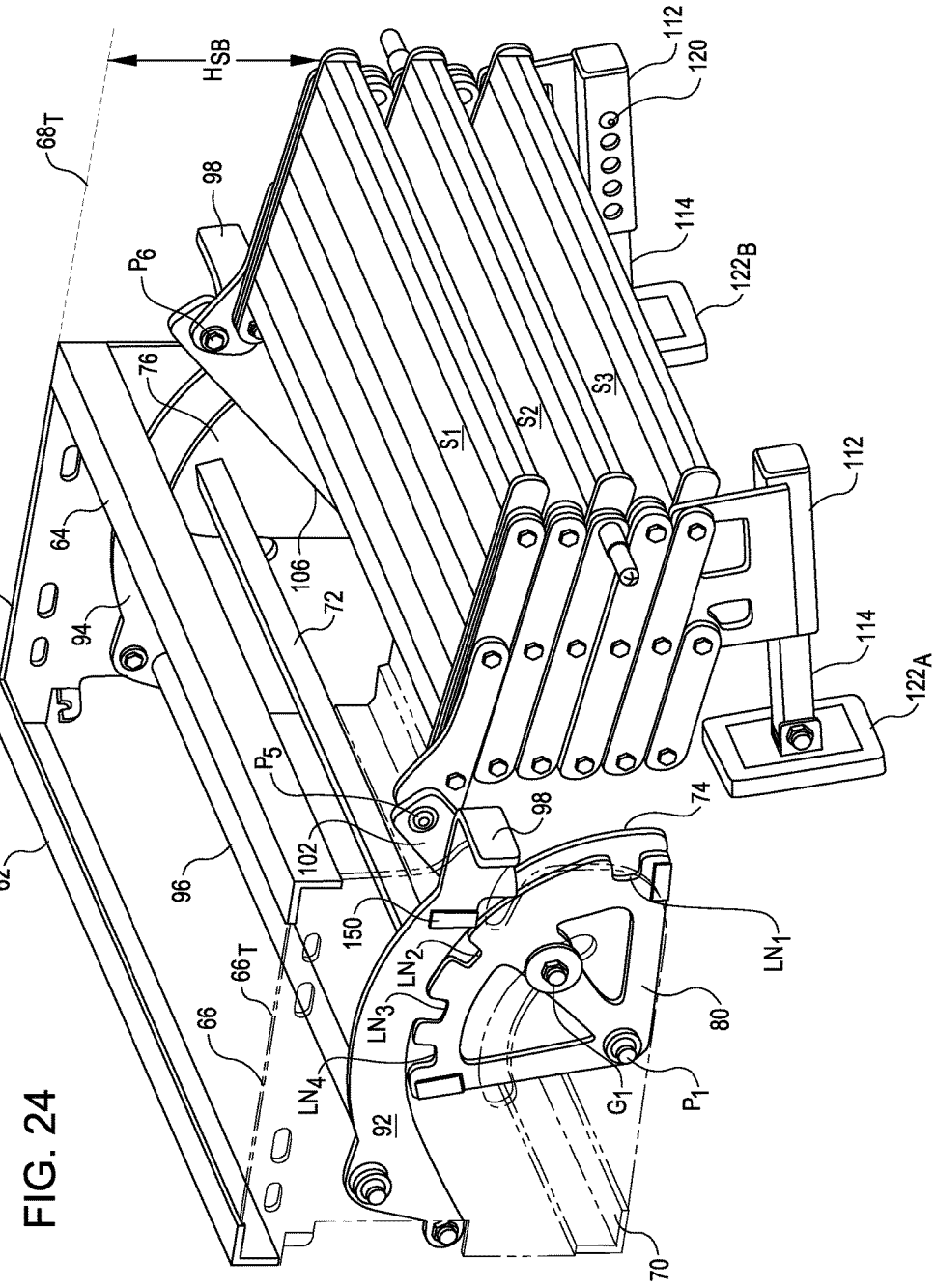

In an embodiment, as seen in FIG. 24 wherein the first 80 and second 90 indexing plates include a first recessed locking notch $LN_1$, a second recessed locking notch $LN_2$, a third recessed locking notch $LN_3$, and a fourth recessed locking notch $LN_4$, the placement of the latch tongues $92_T$ and $94_T$ in the third locking notch $LN_3$ may be used to secure the retractable stair system 54 in a second stair height configuration, wherein the stair $S_1$ is adjusted to a height $H_{SB}$ below the top $66_T$ of said first side plate 66 and below the top $68_T$ of the second side plate 68.

In an embodiment, as seen in FIG. 25 wherein the first 80 and second 90 indexing plates include a first recessed locking notch $LN_1$, a second recessed locking notch $LN_2$, a third recessed locking notch $LN_3$, and a fourth recessed locking notch $LN_4$, the placement of the latch tongues $92_T$ and $94_T$ in the fourth locking notch $LN_4$ may be used to secure the retractable stair system 54 in a third stair height configuration, wherein the stair $S_1$ is adjusted to a height $H_{SC}$ below the top $66_T$ of said first side plate 66 and below the top $68_T$ of the second side plate 68. In this example, the adjustment of height $H_S$ of the stair $S_1$ below the top $66_T$ of the first side plate 66 and below the top $68_T$ of the second side plate 68 may be about seven (7) inches. In other embodiments, as just noted above, the adjustment of height $H_S$ of the stair $S_1$ below the top $66_T$ of the first side plate 66 and below the top $68_T$ of the second side plate 68 may be as much as about seven (7) inches, or less.

Attention is directed to FIGS. 30 through 35, where the use of shelf brackets 160, or 162, or 164 are illustrated. The shelf brackets 160 may be utilized when four steps S are provided. The shelf brackets 162 may be utilized when five steps S are provided. The shelf brackets 164 may be provided when six steps S are provided. As illustrated in FIGS. 30 through 35, although similar shelf brackets 160, 162 or 164 may be provided, the use of a larger number of steps requires lower mounting of the shelf brackets 160, 162 or 164, which may be facilitated by changing the configuration utilized for mounting brackets 161, 163, and 165, respectively.

It is to be appreciated that the retractable stair system with precision elevation control as disclosed herein is an appreciable improvement in the art of stairs for vehicles. The novel design for a retractable stair system with precision elevation control addresses the problem of how to provide for service above differing or uneven substrates, such as rocky ground located below the stairs at the location of a parked vehicle. The embodiments have been thoroughly described to enable those of ordinary skill in the art to make and use the invention, including embodiments which utilize aircraft grade aluminum and stainless steel components, for corrosion resistance during years of outdoor use, such as on various camper designs.

Although only a few exemplary embodiments have been described in detail, various details are sufficiently set forth in the drawings and in the specification provided herein to enable one of ordinary skill in the art to make and use the invention(s), which need not be further described by additional writing in this detailed description. It will be readily apparent to those skilled in the art that the retractable stair system with precision elevation control may be modified from those embodiments provided herein, without materially departing from the novel teachings and advantages provided.

The aspects and embodiments described and claimed herein may be modified from those shown without materially departing from the novel teachings and advantages provided by this invention, and may be embodied in other specific forms without departing from the spirit or essential characteristics thereof. Therefore, the embodiments presented herein are to be considered in all respects as illustrative and not restrictive. As such, this disclosure is intended to cover the structures described herein and not only structural equivalents thereof, but also equivalent structures. Numerous modifications and variations are possible in light of the above teachings. It is therefore to be understood that within the scope of the appended claims, the invention(s) may be practiced otherwise than as specifically described herein. Thus, the scope of the invention(s), as set forth in the appended claims, and as indicated by the drawing and by the foregoing description, is intended to include variations from the embodiments provided which are nevertheless described by the broad interpretation and range properly afforded to the plain meaning of the claims set forth below.

The invention claimed is:

1. A retractable stair system for a vehicle, comprising:
 a frame, said frame comprising a first side plate and a second side plate, said first and second side plates located at a first frame side and at a second frame side, respectively, and spaced apart by longitudinal structural members, said first side plate and said second side plate each further including (a) first edgewalls defining an annular arc slide guide cutout therein, and (b) second edgewalls defining a recessed latch finger cutout therein;
 a first keeper plate and a second keeper plate, said first keeper plate and said second keeper plate pivotally affixed to said frame at said first frame side and at second frame side, respectively;
 a first indexing plate and a second indexing plate, said first indexing plate and said second indexing plate pivotally affixed to said frame at a first frame side and at a second frame side, respectively, and each of said first indexing plate and said second indexing plate further comprising an arcuate upper surface having a plurality of locking notches downwardly recessed therein; and
 a first latch and a second latch, said first latch and said second latch each having a pivot neck, and pivotally affixed at said pivot neck to said frame at said first frame side and at said second frame side, respectively, and each of said first latch and said second latch further comprising a downwardly extending latch tongue sized and shaped for interfitting locking engagement with said locking notches in said first indexing plate and said second indexing plate, respectively.

2. A retractable stair system for a vehicle as set forth in claim 1, further comprising:
 at least one keeper longitudinal stiffener, said at least one keeper longitudinal stiffener extending between said first keeper plate and said second keeper plate; and
 wherein said at least one keeper longitudinal stiffener is sized and shaped to keep said first and second keeper plates adjacent said first and second indexing plates, respectively, so as to prevent slippage of said latch tongue of said first latch with respect to said first indexing plate, and of said latch tongue of said second latch with respect to said second indexing plate, when said latch tongue of said first latch and said latch tongue of said second latch are latched in one of said recessed locking notches in said first indexing plate and in said second indexing plate, respectively.

3. A retractable stair system for a vehicle as set forth in claim 1, further comprising:
 (a) a first flat bar arm having a proximal end securely attached to said first keeper plate, and a distal end that extends outwardly from said first keeper plate;
 (b) a second flat bar arm, said second flat bar arm having a proximal end securely attached to said second keeper plate, and a distal end that extends outwardly from said second keeper plate; and
 (c) wherein said first flat bar arm and said second flat bar arm are configured for arcuate movement in concert with said first keeper plate and said second keeper plate, respectively.

4. A retractable stair system for a vehicle as set forth in claim 3, further comprising:
 (a) a first adapter bracket having a proximal end pivotally attached at or near said distal end of said first flat bar arm, and a distal end that extends outwardly from said first flat bar arm; and b) a second adapter bracket having a proximal end pivotally attached at or near said distal end of said second flat bar arm, and a distal end that extends outwardly from said second flat bar arm.

5. A retractable stair system for a vehicle as set forth in claim 4, wherein said first adapter bracket and said second adapter bracket each comprise a generally L-shaped ear portion at said proximal end thereof, respectively, and wherein said first adapter bracket is pivotally attached to said first flat bar arm at said ear shaped portion of said first adapter bracket, and wherein said second adapter bracket is pivotally attached to said second flat bar arm at said ear shaped portion of said second adapter bracket.

6. A retractable stair system for a vehicle as set forth in claim 5, further comprising:
   extensible-retractable scissors stair assembly, said extensible-retractable stair assembly comprising a first scissors assembly and a second scissors assembly, said first scissors assembly and said second scissors assembly affixed to said first adapter bracket and to said second adapter bracket, respectively.

7. A retractable stair system for a vehicle as set forth in claim 6, wherein said first scissors assembly and said second scissors assembly each comprises a plurality of outward elements and a plurality of downward elements, and wherein said first scissors assembly and said second scissors assembly are spaced apart by a number N of stairs S in a series of stairs $S_1$ to $S_N$, wherein N is a positive integer between two and six inclusive, and wherein each of said stairs S is securely affixed between selected outward elements of said first scissors assembly and said second scissors assembly.

8. A retractable stair system for a vehicle as set forth in claim 7, wherein said stairs S in said series of stairs $S_1$ to $S_N$ further comprises an upper surface, and wherein said upper surface further comprises a non-skid surface portion.

9. A retractable stair system for a vehicle as set forth in claim 7, further comprising a first extensible support leg and a second extensible support leg, and wherein said first extensible leg is extendable to a selected height $H_{F1}$, and wherein said second extensible support leg is extendable to a selected height $H_{F2}$, and wherein said first extensible support leg and said second extensible support leg are independently extendable, so that selected height $H_{F1}$ and selected height $H_{F2}$ may be the same or different.

10. A retractable stair system for a vehicle as set forth in claim 9, wherein each of said first and second extensible support legs comprise
   an upper support member having a tubular portion with interior sidewalls, said upper support member having a plurality of generally vertically disposed holes through said tubular portion defined by edgewalls therein, and
   a lower support member, said lower support member sized and shaped for sliding engagement within said upper support member, and further comprising an outwardly biased detent sized and shaped to fit in one of said holes in said tubular portion; and
   wherein said selected height $H_{F1}$ and selected height $H_{F2}$ are each adjustable by manipulation of said detent to change the position of said lower support member within said upper support member, so as to lengthen or shorten the selected height $H_{F1}$ or selected height $H_{F2}$.

11. A retractable stair system for a vehicle as set forth in claim 10, wherein each of said first and second extensible support legs further comprise a foot pad, said foot pad pivotally connected to said lower support member.

12. A retractable stair system for a vehicle as set forth in claim 10, wherein each of said foot pads comprises a substrate engaging surface, and wherein said foot pads are each affixed to said lower support member so that a majority of said substrate engaging surface is located inwardly toward said stairs.

13. A retractable stair system for a vehicle as set forth in claim 7,
   wherein said first and second indexing plates comprise a first recessed locking notch, a second recessed locking notch, a third recessed locking notch, and a fourth recessed locking notch;
   wherein said first side plate includes a top;
   wherein said second side plate includes a top; and
   wherein adjustment of said latch tongue of said first latch and of said latch tongue of said second latch to said second recessed locking notch adjusts the stair $S_1$ to a height $H_{SA}$ below the top of said first side plate and below the top of said second side plate.

14. A retractable stair system for a vehicle as set forth in claim 7,
   wherein said first and second indexing plates comprise a first recessed locking notch, a second recessed locking notch, a third recessed locking notch, and a fourth recessed locking notch;
   wherein said first side plate includes a top;
   wherein said second side plate includes a top; and
   wherein adjustment of said latch tongue of said first latch and of said latch tongue of said second latch to said third recessed locking notch adjusts the stair $S_1$ to a height $H_{SB}$ below the top of said first side plate and below the top of said second side plate.

15. A retractable stair system for a vehicle as set forth in claim 7,
   wherein said first and second indexing plates comprise a first recessed locking notch, a second recessed locking notch, a third recessed locking notch, and a fourth recessed locking notch;
   wherein said first side plate includes a top;
   wherein said second side plate includes a top; and
   wherein adjustment of said latch tongue of said first latch and of said latch tongue of said second latch to said fourth recessed locking notch adjusts the stair $S_1$ to a height $H_{SC}$ below the top of said first side plate and below the top of said second side plate.

16. A retractable stair system for a vehicle as set forth in claim 7,
   wherein said first and second indexing plates comprise a plurality of working recessed locking notches;
   wherein said first side plate includes a top;
   wherein said second side plate includes a top; and
   wherein adjustment of said latch tongue of said first latch and of said latch tongue of said second latch to one of said plurality of working recessed locking notches adjusts said stair $S_1$ to a height $H_S$ below the top of said first side plate and below the top of said second side plate.

17. A retractable stair system for a vehicle as set forth in claim 16, wherein adjustment to said height $H_S$ of said stair $S_1$ below the top of said first side plate and below the top of said second side plate is about seven (7) inches, or less.

18. A retractable stair system for a vehicle as set forth in claim 17, wherein said frame further comprises a lower longitudinal member, and further comprising a first shelf bracket and a second shelf bracket, said first and said second shelf brackets affixed to said lower longitudinal member adjacent and biased toward said first frame side and toward said second frame side, respectively, and adapted to receive and support said extensible-retractable stair assembly.

19. A retractable stair system for a vehicle as set forth in claim 7,
  wherein said first and second indexing plates comprise a first recessed locking notch, a second recessed locking notch, a third recessed locking notch, and a fourth recessed locking notch;
  wherein said first side plate includes a top;
  wherein said second side plate includes a top; and
  wherein adjustment of said latch tongue of said first latch and of said latch tongue of said second latch to first recessed locking notch secures said stair $S_1$ to a stowed position, wherein said stair $S_1$ is substantially secured between said first side plate and said second side plate.

20. A retractable stair system for a vehicle as set forth in claim 19, wherein said frame further comprises a lower longitudinal member, and further comprising a first shelf bracket and a second shelf bracket, said first and said second shelf brackets affixed to said lower longitudinal member adjacent and biased toward said first frame side and toward said second frame side, respectively, and adapted to receive and support said extensible-retractable stair assembly.

21. A retractable stair system for a vehicle as set forth in claim 6, further comprising a latch pipe having first and second ends, and wherein said first and second ends of said latch pipe are configured for mating engagement with said recessed latch finger cutout in said first side plate and in said second side plate, respectively, so that said latch pipe vertically supports said extensible-retractable scissors stair assembly when said extensible-retractable stair assembly is placed in a storage position.

22. A retractable stair system for a vehicle as set forth in claim 1, wherein said first indexing plate has an outer side and an inner side, and wherein said first side plate comprises an inner side, and wherein low friction surface pad are affixed to said outer side of said first indexing plate, thereby decreasing friction between said inner side of said first side plate and said outer side of said first indexing plate, to facilitate arcuate movement of said first indexing plate with respect to said first side plate.

23. A retractable stair system for a vehicle as set forth in claim 1, wherein said second indexing plate has an outer side and an inner side, and wherein said second side plate comprises an inner side, and wherein one or more low friction surface pads are affixed to said outer side of said second indexing plate, thereby decreasing friction between said inner side of said second side plate and said outer side of said second indexing plate, to facilitate arcuate movement of said second indexing plate with respect to said second side plate.

24. A retractable stair system for a vehicle as set forth in claim 1, wherein said first latch and said second latch each comprise a body having a concave lower portion from which their respective latch tongue protrudes, and which concave lower portion substantially conforms in shape to said arcuate upper surface of said first indexing plate and said second indexing plate, respectively.

25. A retractable stair system for a vehicle as set forth in claim 24, wherein said first latch and said second latch each further comprise a distal end having a latch handle thereon.

26. A retractable stair system for a vehicle as set forth in claim 25, wherein said latch handle is oriented substantially transverse to said body of said first latch and of said second latch, and outwardly from said first side plate and said second side plate, respectively.

27. A retractable stair system for a vehicle, comprising:
  a frame, said frame comprising a first side plate having a top and an inner side, and a second side plate having a top and an inner side, said first and second side plates located at a first frame side and at a second frame side, respectively, and spaced apart by longitudinal structural members, said first side plate and said second side plate each further including (a) first edgewalls defining an annular arc slide guide cutout therein, and (b) second edgewalls defining a recessed latch finger cutout therein;
  a first keeper plate and a second keeper plate, said first keeper plate and said second keeper plate pivotally affixed to said frame at said first frame side and at second frame side, respectively;
  a first indexing plate and a second indexing plate, said first indexing plate and said second indexing plate pivotally affixed to said frame at a first frame side and at a second frame side, respectively, and each of said first indexing plate and said second indexing plate further comprising an arcuate upper surface having a plurality of locking notches downwardly recessed therein;
  a first latch and a second latch, said first latch and said second latch each having a pivot neck, and pivotally affixed at said pivot neck to said frame at said first frame side and at said second frame side, respectively, and each of said first latch and said second latch comprising a downwardly extending latch tongue sized and shaped for interfitting locking engagement with said locking notches in said first indexing plate and said second indexing plate, respectively;
  means for an extensible-retractable scissors stair assembly, said extensible-retractable scissors stair assembly comprising a first scissors assembly and a second scissors assembly, and wherein each of said first scissors assembly and said second scissors assembly comprises a plurality of outward elements and a plurality of downward elements, and wherein said first scissors assembly and said second scissors assembly are spaced apart by a number N of stairs S in a series of stairs $S_1$ to $S_N$, wherein N is a positive integer between two and six inclusive, and wherein each of said stairs S is securely affixed between selected outward elements of said first scissors assembly and said second scissors assembly; and
  wherein adjustment of said latch tongue of said first latch and of said latch tongue of said second latch between selected locking notches downwardly recessed in said first and said second index plates adjusts said stair $S_1$ to a height $H_S$ below the top of said first side plate and below the top of said second side plate.

28. A retractable stair system for a vehicle as set forth in claim 27, further comprising a first extensible support leg and a second extensible support leg, and wherein said first extensible leg is extendable to a selected height $H_{F1}$, and wherein said second extensible support leg is extendable to a selected height $H_{F2}$, and wherein said first extensible support leg and said second extensible support leg are independently extendable, so that selected height $H_{F1}$ and selected height $H_{F2}$ may be the same or different.

* * * * *

UNITED STATES PATENT AND TRADEMARK OFFICE
CERTIFICATE OF CORRECTION

PATENT NO.         : 9,527,448 B1
APPLICATION NO.    : 15/149138
DATED              : December 27, 2016
INVENTOR(S)        : Jack Kay et al.

Page 1 of 2

It is certified that error appears in the above-identified patent and that said Letters Patent is hereby corrected as shown below:

In the Specification

Column 4, Line 57, after the words "extensible-retractable scissors", delete "stairs" and substitute therefore --stair--.

Column 5, Line 42, after the words "in a", delete "see-though" and substitute therefore --see-through--.

Column 5, Line 61, delete "retractable-scissors" and substitute therefore --retractable scissors--.

Column 5, Line 63, after the words "in a", delete "see-though" and substitute therefore --see-through--.

Column 6, Line 9, after the words "Fig. 24", delete "the" and substitute therefore --an--.

Column 6, Line 18, after the words "in a", delete "see-though" and substitute therefore --see-through--.

Column 7, Line 20, after the word "opposing", delete "side" and substitute therefore --sides--.

Column 8, Line 17, delete "extensible retractable" and substitute therefore --extensible-retractable--.

Column 8, Line 29, after the word "44C", insert --provides a--.

Column 9, Line 38, after the words "The entire", insert --extensible--.

Column 9, Line 64, after the words "just described, the", delete "retractable-extensible" and substitute therefore --extensible-retractable--.

Signed and Sealed this
Sixth Day of June, 2017

Michelle K. Lee
*Director of the United States Patent and Trademark Office*

CERTIFICATE OF CORRECTION (continued)
U.S. Pat. No. 9,527,448 B1

Column 10, Line 45, after the word "stair", delete "assembly" and substitute therefore --system--.

Column 11, Line 11, after the words "indexing plate", insert --80--.

Column 11, Line 17, after the words "locking the", delete "retractable-extensible scissors stairs" and substitute therefore --extensible-retractable scissors stair--.

Column 11, Line 32, after the word "respectively.", delete "15.".

Column 12, Line 38, after the words "extensible-retractable", insert --scissors--.

Column 12, Line 41, after the words "the entire", delete "retractable stair", and substitute therefore --extensible-retractable scissors stair--.

Column 12, Line 53, after the words "slide guide 84", delete "which may be in the shape of an annular arc shaped slide guide 84".

Column 13, Line 10, after the words "extensible-retractable", insert --scissors--.

Column 13, Line 36, after the words "extensible-retractable", insert --scissors--.

Column 13, Line 62, after the words "extensible-retractable", insert --scissors--.

Column 14, Line 10, after the words "inner side", delete "681" and substitute therefore --$68_I$--.

Column 14, Line 16, after the word "surface", delete "pad" and substitute therefore --pads--.

Column 14, Line 17, after the words "retractable stair", delete "assembly" and substitute therefore --system--.

Column 16, Line 14, after the words "frame side and at", insert --said--.

In the Claims

Column 17, Line 17, after the words "extensible-retractable", insert --scissors--.

Column 17, Line 39, after the word "extensible", insert --support--.

Column 19, Line 22, after the words "extensible-retractable", insert --scissors--.

Column 19, Line 30, after the words "extensible-retractable", insert --scissors--.

Column 19, Line 35, after the word "surface", delete "pad" and insert therefore --pads--.

Column 20, Line 56, after the word "extensible", insert --support--.